US010682210B1

(12) United States Patent
LaMar et al.

(10) Patent No.: US 10,682,210 B1
(45) Date of Patent: Jun. 16, 2020

(54) DIGITAL FULL ARCH METHOD FOR IMMEDIATE DEFINITIVE DENTAL PROSTHESES

(71) Applicant: HYBRIDGE, LLC, Rochester, NY (US)

(72) Inventors: Frank R. LaMar, Pittsford, NY (US); Tom Lake, Rochester, NY (US); Landon Coats, Victor, NY (US); Kenneth J. Wilson, Hampstead, NH (US)

(73) Assignee: HYBRIDGE, LLC, Rochester, NY (US)

( * ) Notice: Subject to any disclaimer, the term of this patent is extended or adjusted under 35 U.S.C. 154(b) by 198 days.

(21) Appl. No.: 15/681,361

(22) Filed: Aug. 19, 2017

Related U.S. Application Data

(60) Provisional application No. 62/377,577, filed on Aug. 20, 2016.

(51) Int. Cl.

| | |
|---|---|
| ***A61C 13/00*** | (2006.01) |
| ***A61C 13/20*** | (2006.01) |
| ***A61C 1/08*** | (2006.01) |
| ***A61C 8/00*** | (2006.01) |

(52) U.S. Cl.
CPC ............ *A61C 13/0004* (2013.01); *A61C 1/08* (2013.01); *A61C 8/0089* (2013.01); *A61C 13/20* (2013.01); *A61C 2201/005* (2013.01)

(58) Field of Classification Search
CPC ..... A61C 13/0004; A61C 1/08; A61C 8/0089; A61C 13/20
See application file for complete search history.

(56) References Cited

U.S. PATENT DOCUMENTS

| | | | |
|---|---|---|---|
| 3,748,739 | A | 7/1973 | Thibert |
| 4,488,875 | A | 12/1984 | Niznick |
| 4,657,510 | A | 4/1987 | Gittleman |
| 4,986,753 | A | 1/1991 | Sellers |
| 5,052,928 | A | 10/1991 | Andersson |
| 5,064,374 | A | 11/1991 | Lundgren |
| 5,145,372 | A | 9/1992 | Daftary et al. |
| 5,195,890 | A | 3/1993 | Johansson et al. |
| 5,219,286 | A | 6/1993 | Hader |
| 5,234,339 | A | 8/1993 | Grigereit |
| 5,417,570 | A | 5/1995 | Zuest et al. |

(Continued)

FOREIGN PATENT DOCUMENTS

| | | |
|---|---|---|
| WO | WO2009042648 | 4/2009 |

OTHER PUBLICATIONS

PCT/US2017/047564 International Preliminary Report on Patentability Mar. 7, 2019.

(Continued)

*Primary Examiner* — Ralph A Lewis
(74) *Attorney, Agent, or Firm* — Duane C. Basch; Basch & Nickerson LLP

(57) ABSTRACT

The apparatus and methods disclosed utilize a healing assembly including a prosthetic shoe and a healing sleeve that, when used in mating combination, allow the radiographic capture of the prosthetic shoe as it relates to the dental implant surface(s) and the exact orientation of the final prosthetic tooth set-up to provide all information required in one step, for final CAD/CAM of the final fixed prosthetic bridge.

22 Claims, 27 Drawing Sheets

122 118 110 116 134 128 144 114 140

(56) References Cited

U.S. PATENT DOCUMENTS

| | | | | |
|---|---|---|---|---|
| 5,507,643 | A | 4/1996 | Klein | |
| 5,779,477 | A | 7/1998 | Boss | |
| 5,829,977 | A | 11/1998 | Rogers et al. | |
| 5,885,078 | A | 3/1999 | Cagna et al. | |
| 6,126,445 | A | 10/2000 | Willoughby | |
| 6,506,052 | B1 | 1/2003 | Hoffman | |
| 6,672,870 | B2 | 1/2004 | Knapp | |
| 7,322,824 | B2 | 1/2008 | Schmitt | |
| 9,089,382 | B2 * | 7/2015 | Hochman | A61C 8/0001 |
| 10,123,856 | B2 * | 11/2018 | Schulter | A61C 8/0027 |
| 2003/0186187 | A1 | 10/2003 | Germanier | |
| 2004/0053915 | A1 | 3/2004 | Backlock | |
| 2004/0185420 | A1 | 9/2004 | Schulter et al. | |
| 2005/0019727 | A1 | 1/2005 | McGlumphy et al. | |
| 2005/0214717 | A1 | 9/2005 | Freilich et al. | |
| 2006/0154203 | A1 | 7/2006 | Emanuelli | |
| 2009/0081618 | A1 | 3/2009 | LaMar | |
| 2009/0325127 | A1 * | 12/2009 | Kusch | A61C 1/084 433/201.1 |
| 2010/0233654 | A1 | 9/2010 | Yang | |
| 2010/0255445 | A1 * | 10/2010 | Gantes | A61C 1/084 433/173 |
| 2013/0296813 | A2 | 11/2013 | Park | |
| 2015/0004563 | A1 | 1/2015 | Blaisdell et al. | |
| 2015/0025855 | A1 * | 1/2015 | Fisker | A61C 8/0077 703/1 |
| 2017/0112598 | A1 * | 4/2017 | Suttin | A61C 8/0001 |

OTHER PUBLICATIONS

PCT/US2017/047564 An Unofficial International Search Report and Written Opinion dated Jan. 12, 2018.

The Journal of Prosthetic Dentistry; The Glossary of Prosthodontic Terms, Ninth Edition GPT-9; Keith J. Ferro, Editor; 2 pages.

Hybridge; 2007 Slide Presentation Lecture.

Schnitman et al.; Ten-Year Results for Branemark Implants Immediately Loaded with Fixed Prostheses at Implant Placement; (Int-J-Oral-Maxillofacial-Implants. Jul.-Aug. 1997 12(4): 495-503).

Tarnow et al.; Immediate Loading of Threaded Implants at Stage 1 Surgery in Edentulous Arches: Ten Consecutive Case Reports with 1- to 5-Year Data; (Int-J-Oral-Maxillofacial-Implants. May-Jun. 199712(3): 319-324).

Kammeyer et al.; Conversion of a complete dneture to a provisional implant-supported screw-retained fixed prosthesis for immediate loading of a completely edentulous arch: (J Prosthetic Dent. May 2001; 87(5) 473-476).

I-Dent Imaging LTD; Business webpage ident-surgical.com, supplies software and accessory devices for dental implant; I-Dent Imaging Ltd., 4 Yohanan St., PO Box 6402, Hod Hasharon Israel, 45241, Tlelphone 052-5462366 Sep. 18, 2008.

Zimmer Dental; Tapered Screw-Vent adn AdVent Restorative Manual by Zimmer Dental (copyright 2006, Zimmer Dental, Inc. Carlsbad, CA Rev. Oct. 2006).

International Search Report and Written Opinion for PCT/US08/77459 dated Dec. 5, 2008.

* cited by examiner

DIGITAL FULL ARCH METHOD FOR IMMEDIATE DEFINITIVE DENTAL PROSTHESES

This application claims priority under 35 U.S.C. § 119(e) to U.S. Provisional Patent Application No. 62/377,577 for DIGITAL FULL ARCH METHOD FOR DENTAL PROSTHESES, by F. Lamar et al., filed Aug. 20, 2016, which is hereby incorporated by reference in its entirety.

The apparatus and methods disclosed herein permit the efficient design and installation of a fixed bridge type dental prosthesis without customary try-ins, model verification jigs, setups and other prosthetic validation steps. The prosthesis design includes radiographic scanning of a patient's jaw and mouth, including features such as dental implants, associated prosthetic shoes, final prosthetic tooth set-up, as well as tissue surfaces to facilitate the immediate loading (days—weeks) of a dental prostheses (e.g., fixed bridge type) into the mouth, thereby further reducing the delay and the number of steps needed in the clinical and dental laboratory settings to fabricate and install the prostheses and complete the patient's treatment.

BACKGROUND AND SUMMARY

Crowns and removable bridges have often been the approach to preserving diseased teeth or replacing lost teeth. However, such devices tend to fail due to the genetic predisposition of tooth decay and periodontal disease that natural teeth cause in some high risk patients. As a result patients often experience an endless cycle of dental work, with the risk that each procedure increasingly limits dental function and compromises quality of life.

As a solution to such problems, the hybrid fixed bridge (e.g., Hybridge™ and other brands) has been developed. Such a bridge replaces all of the patient's upper and/or lower teeth. The fixed bridge is permanently supported on multiple (typ. 4 or more) dental implants and looks, feels and functions like healthy, natural teeth, and also preserves the jaw bone as a result of stimulation of the bone supporting the implants, thereby preventing bone loss and preserving facial appearance. Moreover, the disclosed process may also be used when doing a cement retained implant supported fixed bridge (not a Hybrid, and not screw retained).

It is not uncommon to utilize threaded implants to support fixed-detachable dentures and other prostheses within a patient's mouth. Also, threaded dental implants have been used to support prostheses at or shortly after the time the implants are placed. For example, P. A. Schnitman et al. (Int-J-Oral-Maxillofacial-Implants. 1997 July-August 12(4):495-503), D. P. Tarnow et al. (Int-J-Oral-Maxillofacial-Implants. 1997 May-June: 12(3):319-24) and G. Kammeter et al. (J Prosthetic Dent. 2001 May; 87(5):473-476) have all described "immediate loading" of implants. For example, the term "immediate denture" is also defined by The Academy of Prosthodontics (THE JOURNAL OF PROSTHETIC DENTISTRY; THE GLOSSARY OF PROSTHODONTIC TERMS (GPT-9), Ninth Ed., May 2017, p. e47) as "any fixed or removable dental prosthesis fabricated for placement immediately following the removal of a natural tooth/teeth" or dentition. The embodiments disclosed herein advocate placing a final, definitive prosthesis with an "early" or "progressive loading" protocol, where initially, a temporary denture is placed on the implants (the provisional) and subsequently the definitive prosthesis is placed. Loading of fixed hybrid bridges (within 2-3 weeks of surgery), using the techniques disclosed herein for immediate and early loading are believed to be more predictable, easier, more cost effective, with less steps, and more precise for a number of reasons, including the manner of preparing for (impressions, radiographic scans, etc.), simultaneously establishing tooth position, time for producing and installing temporary and definitive fixed hybrid bridges, etc. An exemplary disclosure of such a system and methodology is found, for example, in published U.S. Patent Application 2009/0081618 for a SYSTEM AND METHOD FOR IMMEDIATE LOADING OF FIXED HYBRID DENTAL PROSTHESES, by Frank R. LaMar, published Mar. 26, 2009, which is hereby incorporated by reference in its entirety. Moreover, the improved techniques and protocols for edentulous mandibles and maxillas as disclosed herein are not believed to have been previously considered or used.

The timely completion of a fixed hybrid bridge is desirable by many patients. Moreover, aspects of the hybrid bridge system and methodology, as disclosed in detail herein, provides a fixed restoration that may be preferred by many patients, provides improved masticatory function, provides improved aesthetics with ideal gingival contours, and importantly is cost effective as it only requires about five to six implants and uses a simplified technique. Most patients are candidates depending upon the quantity of bone in the symphysis of the mandible and the premaxilla of the maxilla. Once a patient is evaluated for a fixed hybrid bridge, one of the treatment protocols disclosed below may be completed in a timely manner to assure a successful outcome. Moreover, the embodiments disclosed below provide the added value of digital capture of physical patient information—such as implant location and orientation relative to bone, tissue, and teeth—as a means to substantially shorten the time, and the number of patient appointments, to design, manufacture and install a dental prosthetic(s) for a patient.

Disclosed in embodiments herein is a method of preparing and installing a fixed bridge-type dental prosthesis within a patient's mouth, comprising: inserting a plurality of dental implants into the patient's alveolar tissue (mandible or maxilla); attaching, to each of said dental implants, a tapered prosthetic shoe; temporarily affixing, to each of the prosthetic shoes, a healing sleeve having a generally cylindrical outer surface on a first end of the healing sleeve and a tapered interior surface on a first end, said tapered interior surface matching the taper of the prosthetic shoes when said healing sleeves are placed thereon, wherein said healing sleeves prevent the post-implant overgrowth of gingival tissue over the implants; and capturing a radiographic image of the patient's mouth, said captured image including representations of alveolar tissue and gingival tissue as well as each tissue level implant and at least an associated prosthetic shoe. In accordance with a further aspect of the disclosed embodiments, the healing sleeves may be radiographically translucent, which provides the ability to take a digital radiographic image of the underlying prosthetic shoe (affixed to the implant) immediately after surgery and thereby facilitate the accurate and immediate manufacture of the dental prosthetic.

As part of disclosed embodiments, the prosthetic shoes are initially attached to implants to facilitate imaging, design of a prosthesis, and the installation of healing sleeves after implants are installed, and then the shoes (or identical equivalents) end up being the means by which the full prosthesis is attached to the implants. In other words the prosthetic shoes are adhered to and become an integral part of the prosthesis.

BRIEF DESCRIPTION OF THE DRAWINGS

FIG. 15 illustrates an exemplary process for creation of a fixed bridge-type dental prosthesis in a dental laboratory, incorporating the design operations for the digital full arch noted above.

Figure 1:
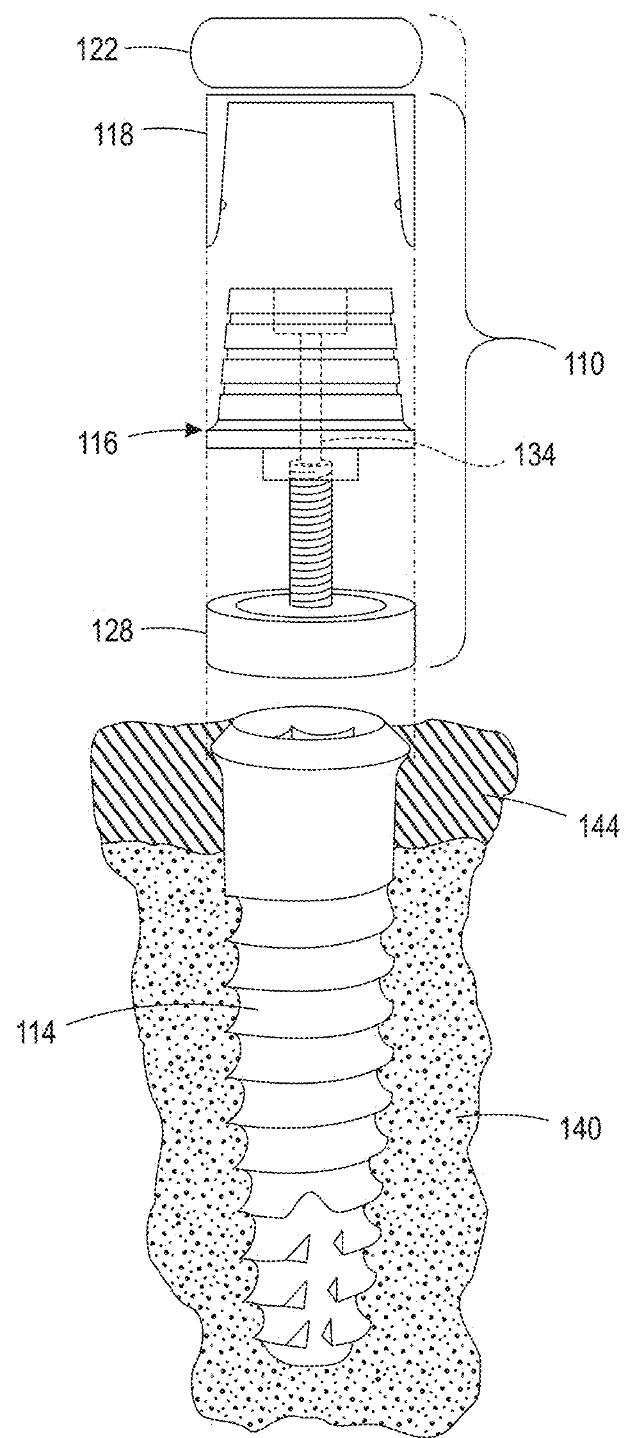
FIG. 1 is an exemplary illustration of a healing assembly for use with a dental implant in accordance with an aspect of the disclosed embodiments.

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

As used herein, the following terms and acronyms are intended to have the meaning indicated, however, such terms are used as illustrative examples and are not intended to limit the scope of the disclosed embodiments:

Prosthetic Tooth Set-up: A predetermined mock-up of the anticipated tooth position and final tooth contours, typically in the form of a removable denture.

Fixed Hybrid Bridge: the name usually referred to when referring to a "Full Arch, screw retained, implant supported, fixed bridge.

Referring to FIG. 1, depicted therein is a healing assembly 110, for use in a dental implant procedure on a patient's alveolar tissue 140 such as the mandible or maxilla. The healing assembly 110 comprises a prosthetic shoe 116 for placement on the dental implant 114 (e.g., a tapered tissue-level implant such as # TTLY3810 from Biohorizons), and a healing sleeve 118, and optionally a tissue collar 128. The healing sleeve 118 is removably mated to the prosthetic shoe, and the healing sleeve provides a generally cylindrical outer surface 120, over at least a lower portion of the healing sleeve, for the patient's gingival tissue 144 to heal around.

Figure 2:
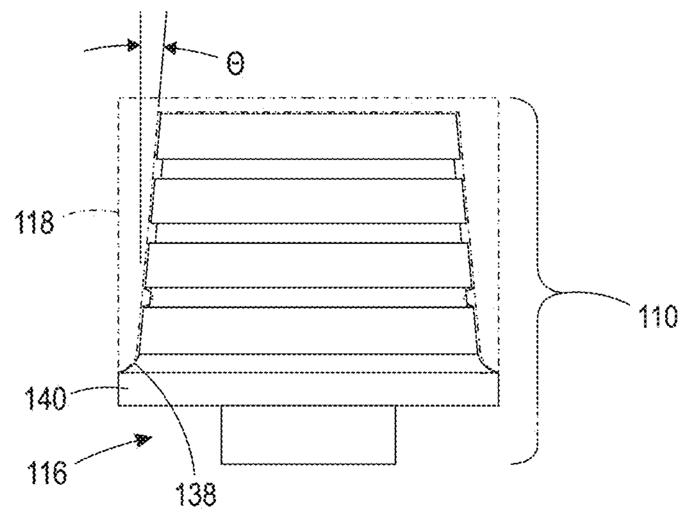
FIGS. 2, 3 and 4A-4B are illustrations of various embodiments of the prosthetic shoe and healing sleeve of FIG. 1.
Figure 3:
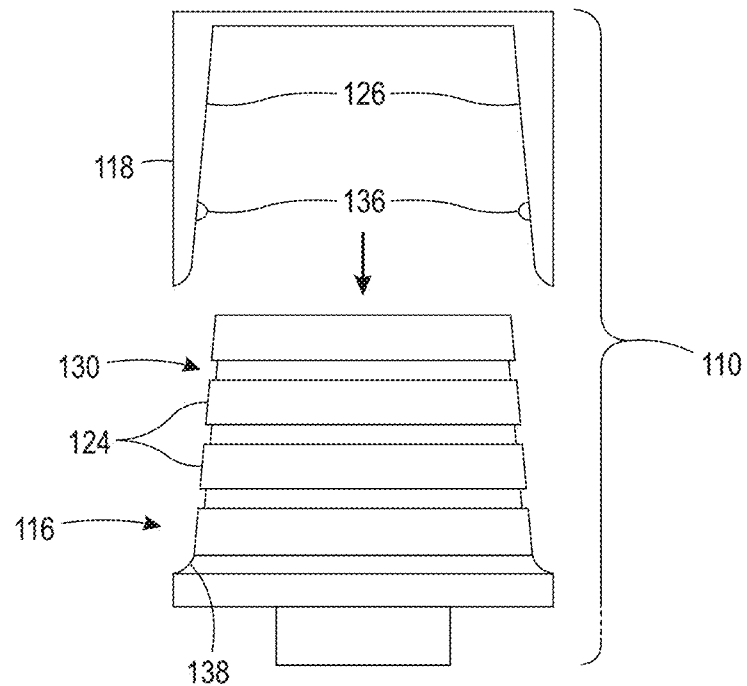

Referring also to FIGS. 2-3, in the healing assembly 110, the prosthetic shoe 116 and the healing sleeve 118 each have at least one mating surface feature to assure the relative position of the healing sleeve to the prosthetic shoe. As depicted, the prosthetic shoe is tapered on at least one exterior surface 124 thereof and the mating feature(s) includes a tapered interior surface 126 on the healing sleeve, where the tapered interior surface generally matches the taper (angle) of the exterior surface of said prosthetic shoe. The taper (θ) of the prosthetic shoe is an angle of about 5-degrees, but could be slightly less or greater, in the range of 1-degree to about 10-degrees. Not only does the taper permit other components to be easily attached over the tapered surface, but the taper further facilitates the installation of the final prosthesis, as will be described below, particularly when the implants are not all fully aligned with one another. For further assuring that a sleeve or prosthesis is fully attached or adhered to the prosthetic shoe, the bottom portion of the shoe includes a curved transition or chamfer 138 to the generally cylindrical shoulder region 140 near the bottom of shoe 116. The curved transition region 138 avoids an abrupt shoulder that might prevent the full insertion of the shoe with a mating component.

Figure 5A:
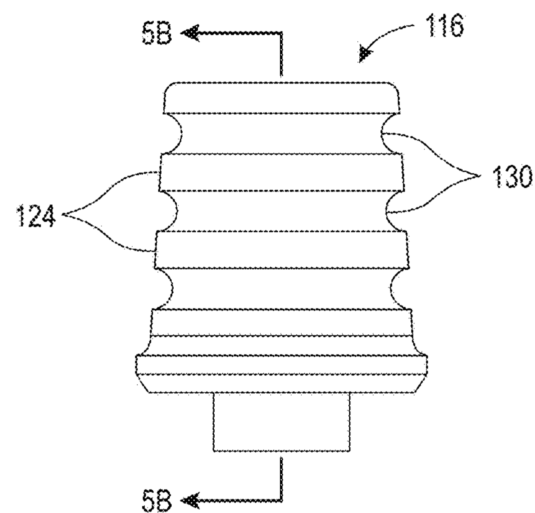
FIGS. 5A-5C are detailed views of the prosthetic shoe of FIG. 1.
Figure 5B:
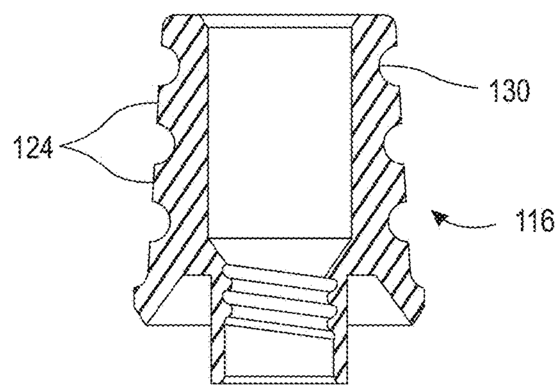
Figure 5C:
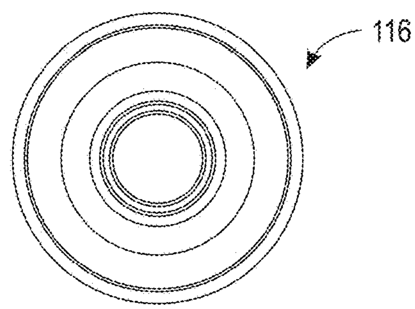

In one embodiment, the prosthetic shoe 116 includes at least one annular groove 130 about an outer surface thereof. The groove may have a squared or radiused bottom profile. Moreover, prosthetic shoe 116 may be reused during attachment of a prosthesis to the dental implant, where the annular groove(s) provides a surface by which the prosthetic shoe is adhered to the prosthesis. FIG. 5 is an illustration of a drawing showing the dimensions for one embodiment of the prosthetic shoe 116, and it will be appreciated that the interior dimensions of the healing sleeve would be similar. Although an embodiment of the prosthesis is described in more detail below, in one embodiment it may be a fixed bridge formed, at least in part, using a polymethyl methacrylate (PMMA) or other appropriate millable material known for dental use.

As illustrated in FIG. 2, for example, the healing sleeve 118 further includes at least one engagement feature 136 for engaging or locking with the prosthetic shoe 116, whereby upon pushing the healing sleeve over the prosthetic shoe as indicated by the arrow, the feature engages an annular groove of the prosthetic shoe to removably attach the healing sleeve to the prosthetic shoe. As depicted, the engagement feature may include a bump(s) or annular ridge extending inward from the interior surface of the healing sleeve 118, or it may be a split or partial ring extending about the interior of the healing sleeve in a concentric manner. Use of such a feature enables the prosthetic shoe 116 and healing sleeve 118 to be placed together and "mated" fashion, and to further permit the shoe and healing sleeve to fit in a snap-together relationship.

As will be appreciated, to facilitate its flexibility relative to the attachment to the prosthetic shoe, the healing sleeve may be made from a non-metallic material such as a "plastic". While a number of plastic materials may be employed, and the method of manufacture may include machining (CNC, screw machine, etc.) and molding, the particular process used is not believed to be critical and may be largely dependent upon the material used for the healing sleeve. In one embodiment, to facilitate the design and placement of a Fixed Bridge Type prosthesis, the healing sleeve 118 may be formed of a non-magnetic material such as an engineering thermoplastic, or more particularly an acetal homopolymer resin such as Delrin® by Dupont or an ultra-high performance biocompatible thermoplastic such as polyaryletherketone (e.g., TECAPEEK Classix™ or PEEK Optima™ available from Ensinger Ltd. or Invibio® Ltd). Moreover, the "radiotranslucent" or radiographically translucent (or possibly even radiographically opaque) material provides an added advantage of enabling the radiographic imaging of the patient's tissue, implants, prosthetic teeth positions, and associated prosthetic shoes with the healing sleeves in place, thereby eliminating or at least reducing costly and time-consuming steps conventionally required for the design and installation of a fixed bridge prosthetic device to the dental implants.

Figure 4A:
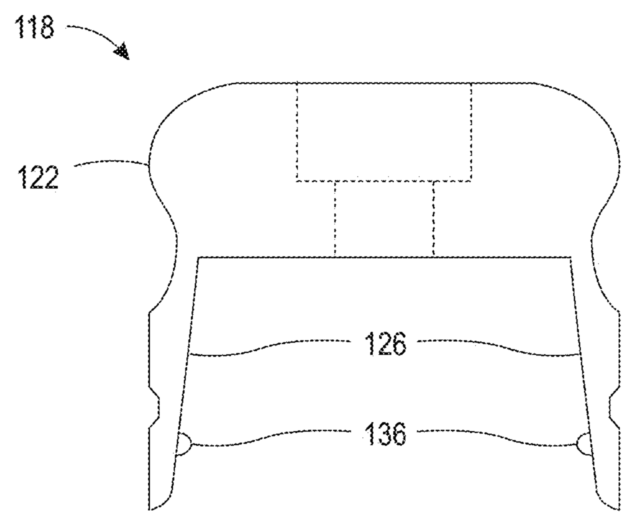
Figure 4B:
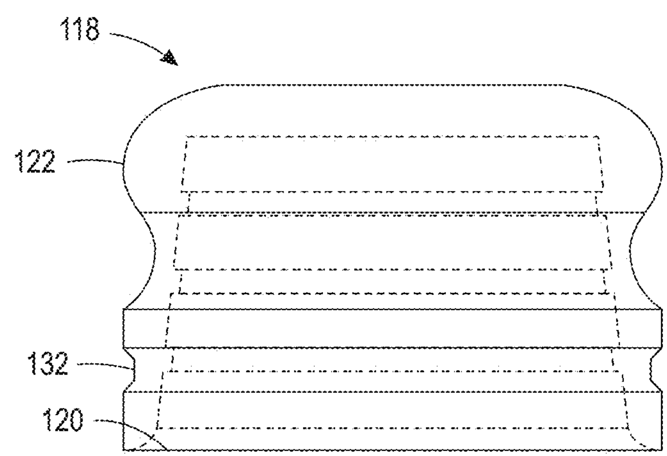

As further illustrated in FIGS. 1 and 4A-4B, healing sleeve 118 includes a bulbous or bulb-shaped outer surface 122 on one end thereof. In one embodiment, the bulb is part of the top or upper end of the healing sleeve 118, such as depicted in FIGS. 4A and 4B. In an alternative embodiment, also contemplated, as depicted in FIG. 4A, the bulb shape is an extension, and may be a separate component, of the healing sleeve 118, which assists in the orientation of the "prosthetic tooth set-up" required in the image capture to the prosthetic shoe 116 and therefore the implant 114. As further illustrated in FIG. 1, the various components may be maintained in position using a screw 134 that has an upper shoulder and a lower end that is threadably engaged within the interior of the implant. One reason the healing sleeve is preferably radiolucent, is so that when applied over the prosthetic shoe a CT scan will only "see" the surface of the prosthetic shoe, and at the same time the healing sleeve with bulb acts as an indexer to the shoe surface and the prosthetic tooth set-up.

As described above relative to FIGS. 1-4, the healing sleeve is removably mated with the prosthetic shoe, and the healing sleeve has a generally cylindrical outer surface over at least its lower portion so that it can provide a surface against which gingival tissue may heal after implant surgery. The outer surface of the healing sleeve may also include other features that are advantageous, such as a suture line or groove 132 in which a suture may be placed our routed and to facilitate the healing of gingival tissue about the implant. And, although the mating surface between the prosthetic shoe and said healing sleeve is a tapered mating surface, there may be alternative features or other mating features that could be suitable to assure an accurate relationship between the two components.

As represented in FIG. 1, implant 114 is described as a tissue level dental implant. It should be appreciated however, that aspects of the disclosed embodiments may be similarly applicable to implants that are placed in a different relationship to the gingival or alveolar tissue. For example, in an embodiment where a bone-level (below tissue surface) implant is employed, a tissue collar 128 or similar component may be placed directly on the top of the implant 114 and then the prosthetic shoe may similarly be placed onto the tissue collar. In this case as well, a threaded screw 134 or similar fastener may be employed to assure that the prosthetic shoe and the tissue collar are attached to the implant. Accordingly, the prosthetic shoe can also be mated to a multi-unit abutment, or in other words an attachment(s) that sits on the implant to change the orientation angle and/or height of the implant interface. In summary, for bone-level implants it is possible to employ tissue collars, tissue cuffs, extenders, multi-unit abutments and the like to bring the prosthetic shoe interface at or above the tissue surface, and these alternatives could still be applied in the manner and using the component disclosed herein.

Referring next to FIGS. 6-10, attention is now turned to the description of a process in which the two-part healing assembly 110 may be used. As has been suggested above, the basic method of use is directed to preparing at least one dental implant 114 for retaining a dental prosthesis (e.g., FIG. 9) within a patient's mouth. The method includes inserting the dental implant 114 into the patient's alveolar tissue (mandible or maxilla), attaching a prosthetic shoe 116 to the dental implant, the prosthetic shoe having an exterior surface with at least one annular groove thereabout; and at least temporarily affixing, in a mating relationship with the prosthetic shoe, a healing sleeve 118 having a generally cylindrical outer surface on at least a first (e.g., lower) end of the healing sleeve and a tapered interior surface on the interior surface of the first end, where the tapered interior surface matches or mates to the taper of the prosthetic shoe when the healing sleeve is affixed thereon. As noted previously, the combination of the prosthetic shoe and the healing sleeve for a healing assembly that further prevents the overgrowth of gingival tissue over the implant post-insertion.

As represented in FIG. 2, for example, temporarily affixing the healing sleeve 118 to the prosthetic shoe 116 causes the engagement feature, such as a bump(s) or annular ridge on the interior surface, to engage an annular groove 130 of the prosthetic shoe, for example, where the engagement feature seats into the groove 130. Once the bump(s) or ridge is seated into the grove, the healing sleeve is locked to the prosthetic shoe so as to removably join the healing sleeve to the prosthetic shoe. And, as was characterized by FIG. 1, attaching the shoe to the dental implant may further include a connector such as a screw 134 passing through the center of the shoe for threadably engaging an inner surface of the dental implant 114. It will be appreciated that alternative methods of associating or affixing the healing sleeve with the prosthetic shoe are possible, including a threaded engagement directly between the two.

Figure 6:
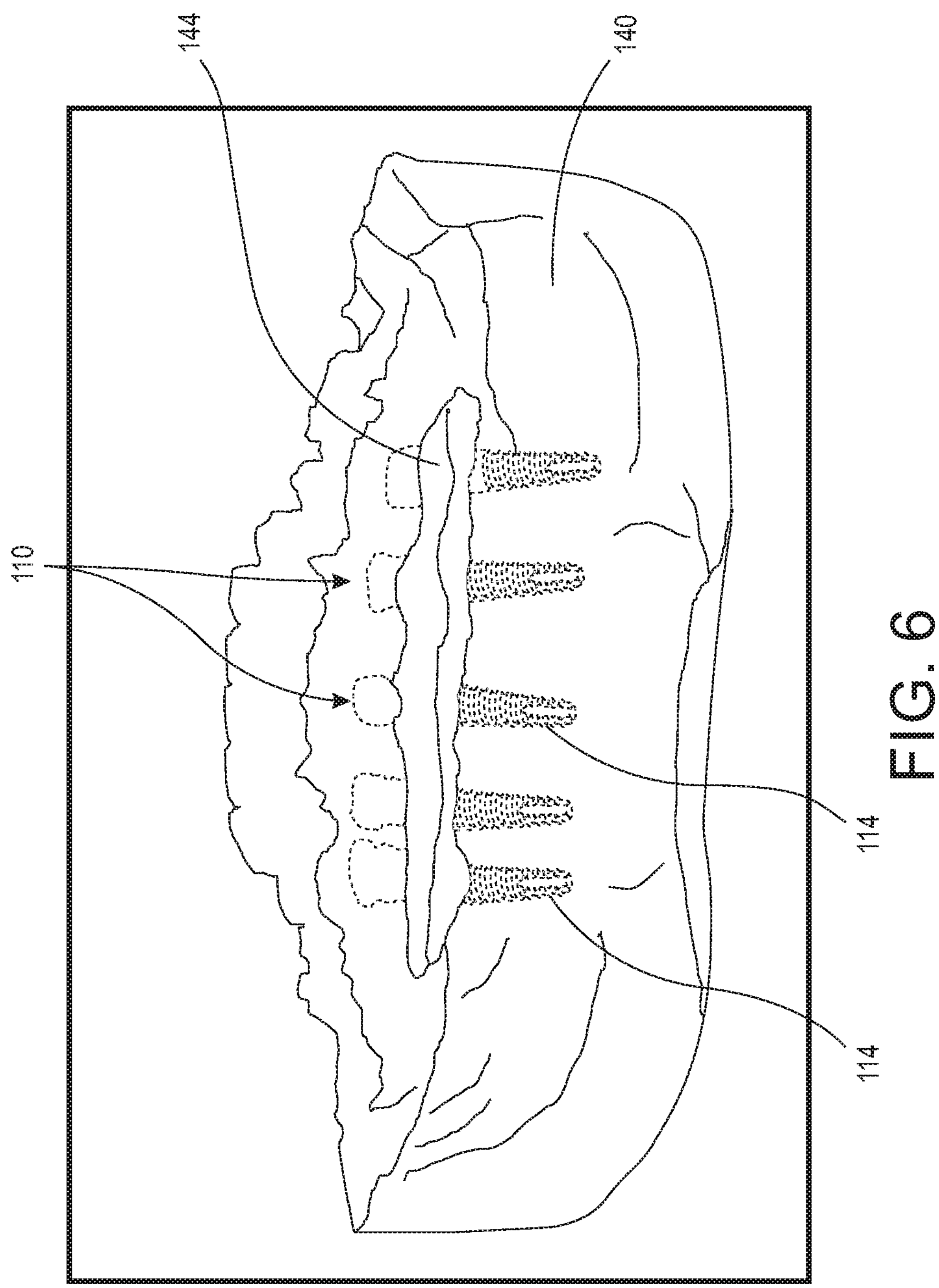
FIG. 6 is an illustrative example of a digital image obtained from a computer tomography (CT) scan of a patient's mouth.
Figure 7:
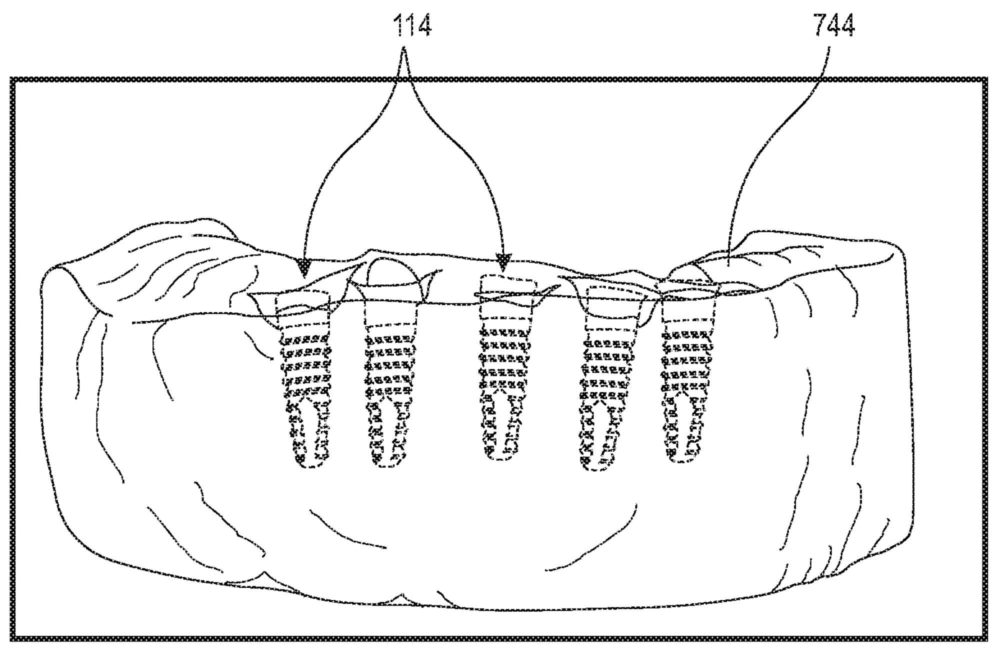
FIGS. 7-11 are exemplary CAD/CAM designs and simulations illustrating the design and installation of a fixed bridge type prosthesis in relation to a patient's mandible.

As suggested above, the use of a radiographically transparent material for the healing sleeves enables the radiographic imaging of the patient's mouth, including the prosthetic tooth position, the implants, prosthetic shoes and tissue surfaces as illustrated, for example, in FIG. 6. FIG. 7 illustrates the placement of dental implants in a patient's alveolar tissue. For example, the radiographic imaging depicted in FIG. 6 may subsequently be employed to isolate the patient's gingival tissue (144) surface such as represented by numeral 744 in FIG. 7, where the upper surface of the implants 114 are in view. One method of use of the disclosed prosthetic shoes and healing sleeves contemplates removing the healing sleeve from the prosthetic shoe, after the gingival tissue has healed around the dental implant, by applying upward force to the healing sleeve sufficient to displace the feature from the annular groove. This operation reveals the underlying, tapered surface of the prosthetic shoe with its annular groove(s). And, the prosthesis may then be permanently affixed to the prosthetic shoe(s), or an identical replacement set of equivalent shoes as described below, thereby facilitating attachment of the prosthetic shoe and prosthesis to the dental implant using a connector or similar fastener (e.g., a screw).

Although it will be appreciated that various features may be presented on the outer surface of the prosthetic shoe to facilitate binding or adhesion to the prosthesis, the illustrated embodiment employs multiple annular grooves 130, concentrically located on the tapered exterior surface of the prosthetic shoe. This configuration, and the details of the grooves themselves, are shown in detail in the part drawing of FIGS. 5A-5C.

Figure 8:
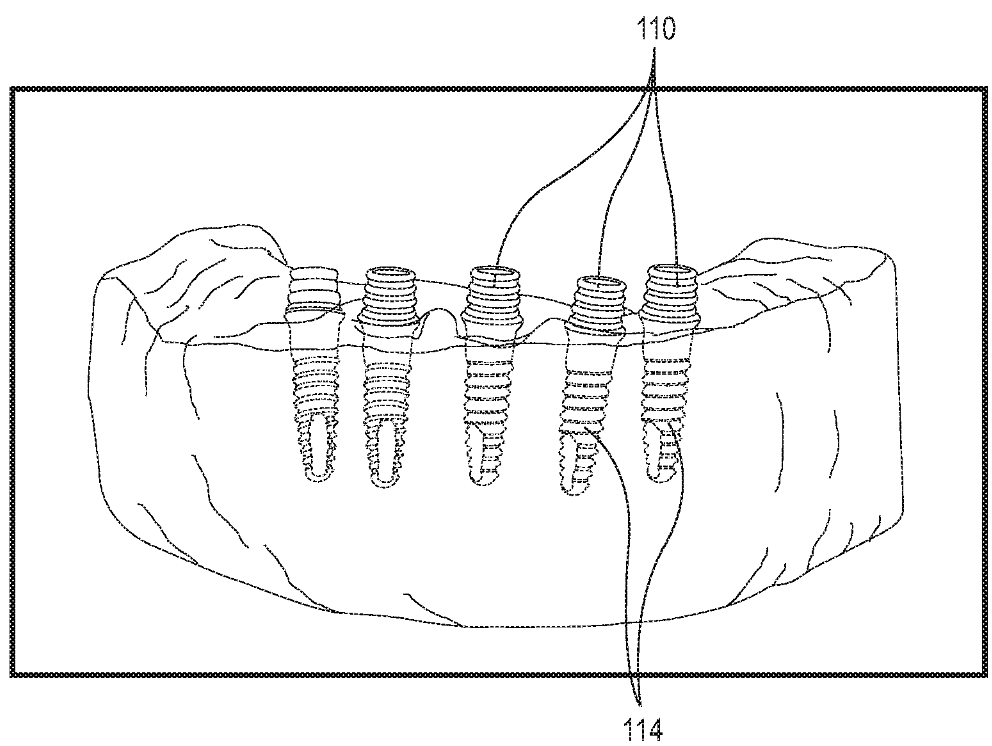
Figure 9:
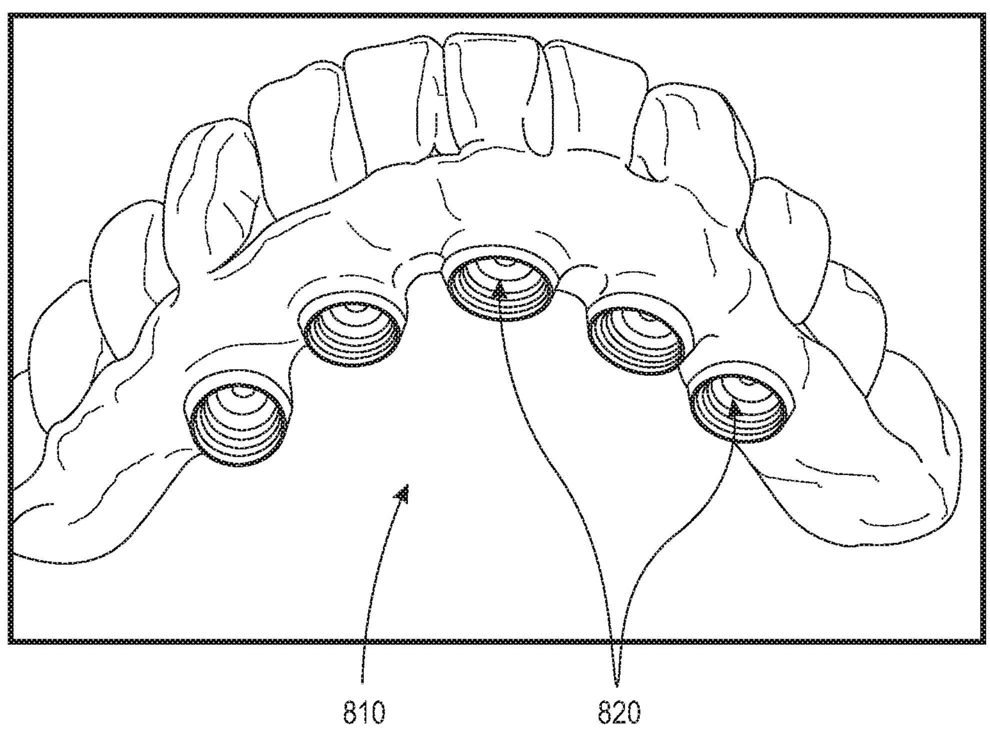
Figure 10A:
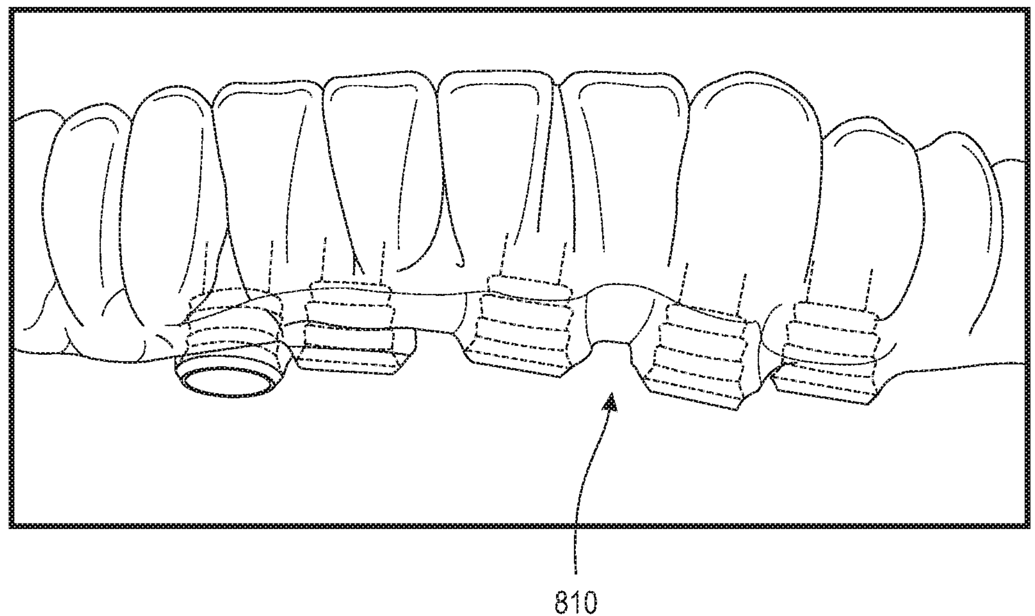
Figure 10B:
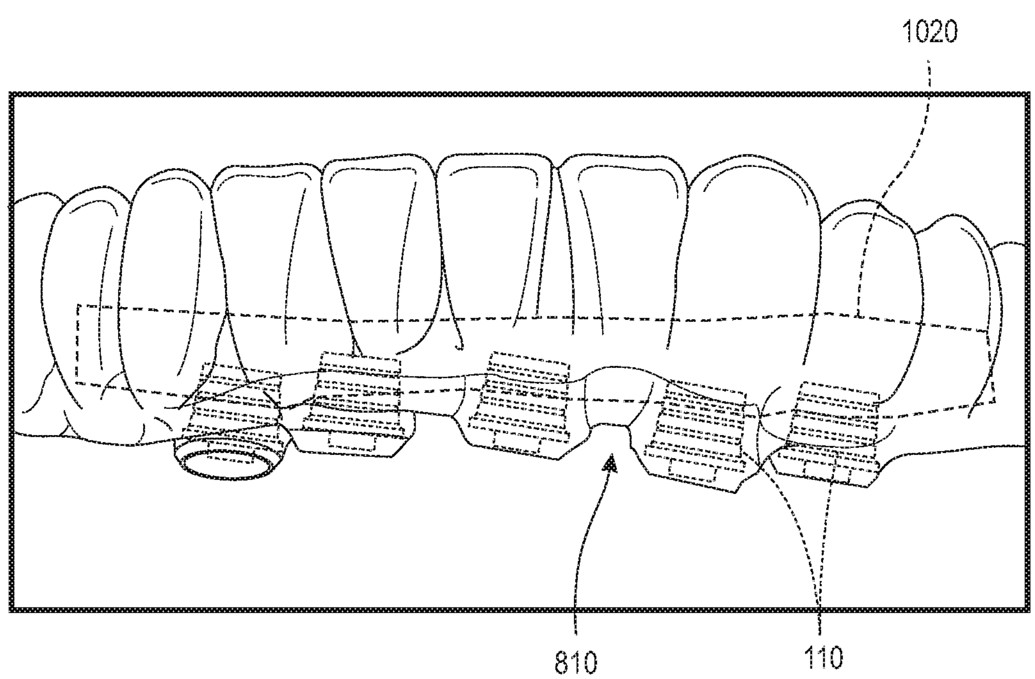
Figure 11:
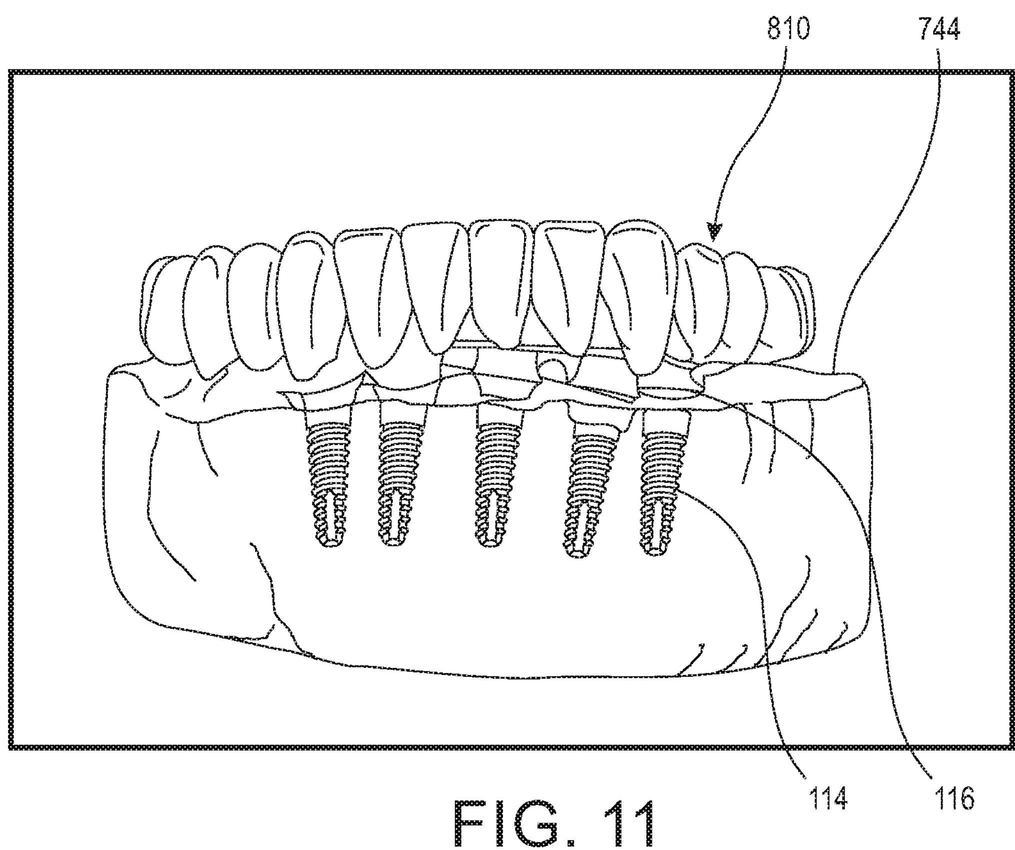

Referring next to remaining FIGS. 7-11, depicted therein are successive illustrations derived from both computerized tomography (CT) scan radiographic images (FIG. 6) and computer-assisted design (CAD) illustrations derived from a dental design software (FIGS. 7-11) of process steps and the resulting imagery and associated designs that may be employed relative to the fabrication and installation of the prosthesis (full bridge) as represented, for example, in FIGS. 9-10A). Reference is also made to FIG. 8, which illustrates a prosthetic shoes mechanically fastened or attached to the dental implants 114. For example, as represented by FIG. 8, a dental design (CAD/CAM) system, such as that available from Zirkonzahn, may be employed to detect and isolate the positions of the implants as well as the prosthetic shoes 116 attached thereto (lying below the radiotranslucent healing sleeves) to provide a multi-dimensional model of the patient's mouth post-implant. The CAD model of FIG. 8 is then employed to create a mock-up or model 810 of the patient's prosthesis (e.g., tooth surfaces), where the CT image data of the gingival surface, prosthetic shoe positions, prosthetic tooth setup, etc. are employed to prepare the design of the prosthesis. An example of the prosthesis model is depicted, for example in FIG. 9, and illustrates the mating cavities 820 found in the bottom of the prosthesis and into which the prosthetic shoes will be subsequently placed and permanently adhered. The various data points may be further employed to create a model 810, and ultimately an actual prosthetic 910. FIGS. 10A and 10B are exemplary digital images illustrating the final removable prosthesis design, and including the prosthetic shoes (outlined in FIG. 10B) permanently transferred and affixed within the cavities. Moreover, prosthetic 810 may further include one or more "bars" 1020 (e.g., FIG. 10B) that not only provide a rigid interconnection between an adhesion surface for the prosthetic shoes themselves, but also provide a surface on which the balance of the fixed bridge prosthesis can be built or adhered to. Bar 1020 may be formed using the output of the dental CAD/CAM system and either machined directly or three-dimensionally (3D) printed and then cast in metal (e.g., investment casting) or other suitable rigid composite material, and then finished. In one embodiment, some or all of the prosthesis 810 may be formed from one or more metals and other compatible materials known for use in the creation or replacement of dentures, including polymethyl methacrylate (PMMA) and the like. Finally, as represented by FIG. 11, the model is completed by fitting the prosthesis 810 onto the shoes 116, depicted as fastened to the implants.

Another advantage of the use of the disclosed healing apparatus, particularly including a bulb-shape on the top thereof is that a temporary prosthesis may be adhered to the healing sleeve with the bulb-shaped top providing a surface for improved retention and stability of the prosthetic tooth set-up. In summary, the disclosed healing assembly provides advantages in indexing of the implant position, healing, imaging of the implant and the associated prosthetic shoe, and the reuse of the prosthetic shoe by allowing it to be permanently affixed to the prosthesis and thus serving as the means by which the prosthesis is attached to the implants.

Figure 12A:
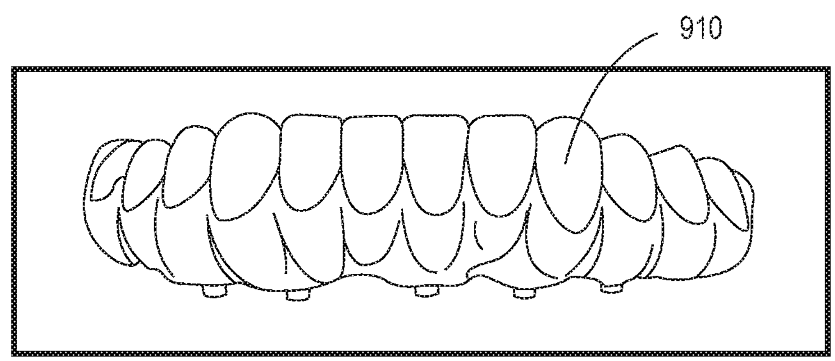
FIGS. 12A-12D are illustrative examples of a final bridge (dental prosthesis) in accordance with an aspect of the disclosed embodiments.
Figure 12B:
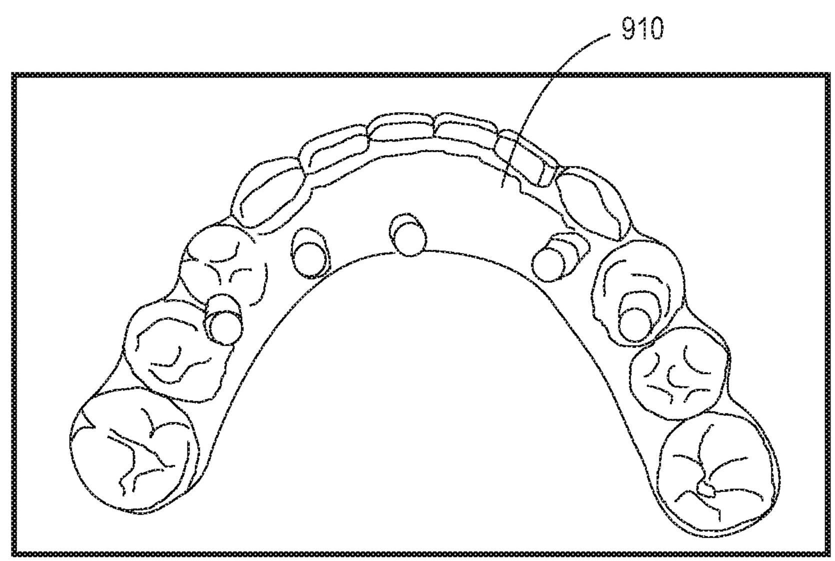
Figure 12C:
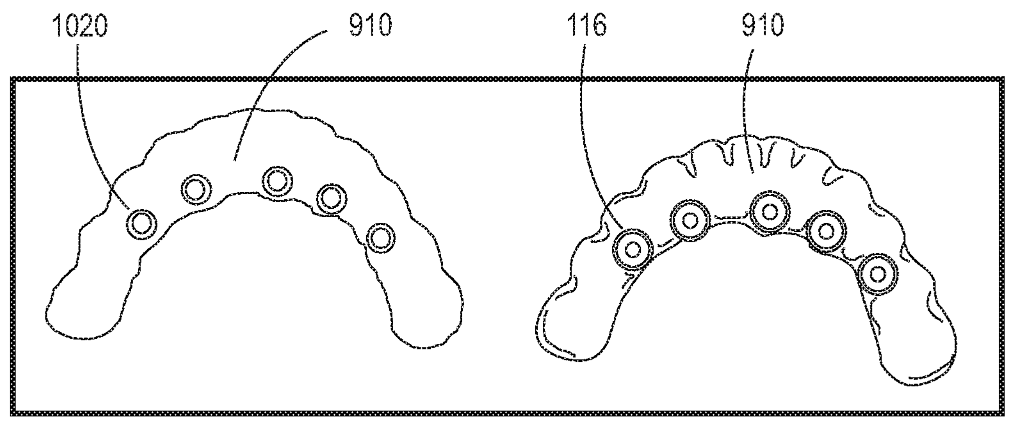
Figure 12D:
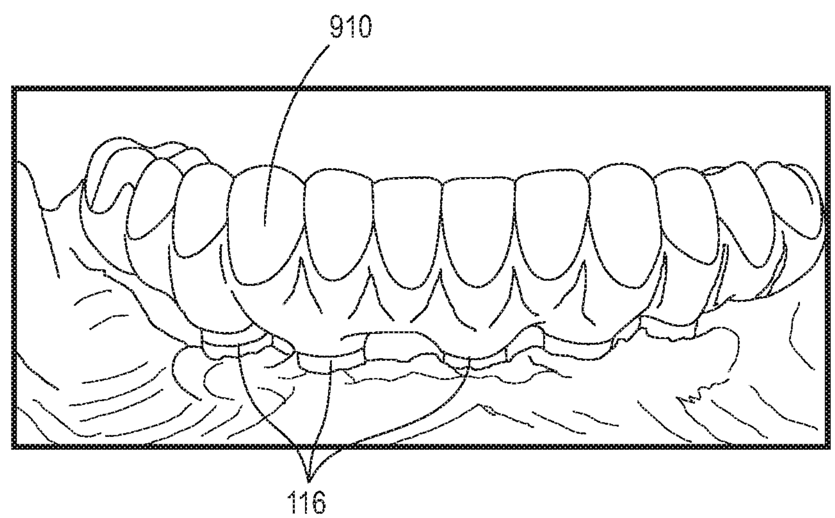

A final prosthetic (bridge), as designed, is depicted in FIGS. 12A-12D. FIG. 12A depicts the front view of the bridge 910, and FIGS. 12B and 12C respectively depict the top and bottom views of the bridge. In particular, the right side of FIG. 12C illustrates the prosthetic bridge with the prosthetic shoes cemented or adhered therein. Thus, FIG. 12C provides a comparison of the bridge without the shoes (left), and with the prosthetic shoes installed (right), creating the final fitting surface on which the fixed implant bridge will sit on top of the implants. FIG. 12D shows the bridge 910 installed in a patient's mouth, and the bottom of the bridge can be seen to be attached to the implants via the prosthetic shoes 116 that are at the gingival surface.

Also contemplated is the use of two sets of prosthetic shoes where a first set is employed as described to facilitate imaging and installation of a temporary prosthetic using the disclosed healing sleeves or caps. Then, upon completion of the permanent dental prosthetic, for each dental implant the first prosthetic shoe is removed from the implant, and the shoe or an identical, second prosthetic shoe is employed and is permanently adhered to the permanent dental prosthetic, and the prosthetic shoe is then used for attachment of the dental prosthetic to the dental implant using a fastener such as a threaded screw. It will be appreciated that the nature and configuration of the fastener is dictated by the type of implant(s) being employed. In other words, the prosthetic shoe starts out attached to the implant for imaging and healing after the implant is installed, and then the shoe (or an identical equivalent) ends up being the means by which the full prosthesis is attached to the implant. The prosthetic shoe becomes an integral part of the prosthesis once it is adhered.

In summary, one method for installation of a fixed bridge-type dental prosthesis within a patient's mouth, includes inserting multiple dental implants 114 into the patient's alveolar tissue 140 (mandible or maxilla), and attaching a prosthetic shoe 116 to each of the dental implants using a center screw through the prosthetic shoes each having a tapered exterior surface with at least one annular groove. To each of the prosthetic shoes, a healing sleeve 118 is temporarily affixed. At one end the healing sleeve has a generally cylindrical outer surface and a tapered interior surface, where the taper matches that of the prosthetic shoes when said healing sleeves are affixed thereon. In addition to the several uses made of the prosthetic shoes and healing sleeves, the combination further prevents the post-insertion overgrowth of gingival tissue over the implants.

Having described the several aspects of the prosthetic design and the use of a novel healing assembly to facilitate the scan of a patient's mouth immediately after insertion of dental implants, in order to accurately characterize the location of not only the implants but also of prosthetic shoes, tissue surfaces, etc., attention is now directed to a method of preparing a fixed bridge-type dental prosthesis and installing the prosthesis within a patient's mouth. In one embodiment described above, the process comprises not only inserting a plurality of dental implants 114 into the patient's alveolar tissue 140 (mandible or maxilla), but attaching, to each of said dental implants, a tapered prosthetic shoe 116, and temporarily affixing, to each of the prosthetic shoes, a healing sleeve 118. The healing sleeve further includes a generally cylindrical outer surface, on at least a first end of the healing sleeve, and a tapered interior surface, the tapered interior surface matching the taper of the prosthetic shoes. And, the healing sleeves are placed to prevent the post-implant overgrowth of gingival tissue over the implants. The process further includes capturing a radiographic image(s) of the patient's mouth, where the captured image(s) includes representations of alveolar tissue and gingival tissue, as well as each tissue level dental implant 114, and at least an associated prosthetic shoe 116 attached to each of the implants, as well as prosthetic tooth setup.

The CT scan data/images are processed in a manner that allows the direct creation of at least one model to be used for formation of the fixed bridge-type dental prosthesis. An exemplary digital full arch design process is further illustrated in FIG. 13. For example, when a patient's case is initially started (1310) an impression is obtained for creation of a 3-in-1 guide (1320). As an example, the 3-in-1 guide is used as a representation of the patient's intended dental prosthetic. Furthermore, the use of impressions further permits scanning of the wax set up to acquire an accurate and detailed starting point, which may subsequently be used in designing the wax-up. To initiate the process, a user such as a dental lab technician or operator would create an order, on a networked computer system using a dental CAD/CAM system such as that available from Zirkonzahn, and reference an adjacent tooth and an antagonist. The lab operator or another user scans in the setup (digital full arch or DFA), opposing model, and the articulation.

Next is the capture and collection of computerized tomography (CT) digital images, preferably at least two scans are obtained (1330), at least one of which is a post-implant scan of the patient's mouth with the prosthetic shoes and healing sleeves installed. The image capture is accomplished via a CT system that captures and combines a series of X-ray images taken from different angles or positions and uses computer processing to create cross-sectional images, or slices, of the bone and soft tissues, as well as implants and other devices inside the patient's mouth.

To facilitate the accurate imaging of the prosthetic shoes and their respective positions and orientations, in one embodiment the healing sleeve that covers the prosthetic shoe comprises a radiographically transparent or radiographically translucent (radiolucent) material as described above. Although, it may also be possible to achieve similar results if one were to employ non-radiolucent materials and perform alternative or additional operations to isolate and locate features of assemblies that include sleeves, shoes and implants or equivalents. Use of the radiographically transparent material permits the use of the CT scan images to accurately locate and extract the prosthetic shoe surfaces and employ such data in a model of the patient's mouth with the implants and shoes present. Moreover, through use of the healing assembly(ies) described above, capturing of the radiographic image of the patient's mouth and a radiopaque prosthetic tooth set-up includes obtaining a plurality of radiographic scans (e.g., CT scans) immediately after dental implant surgery (see e.g., FIG. 6), without the need for delay to await healing of the gingival tissue. This immediate imaging process, facilitated by the radiographically transparent healing sleeves, and a radiopaque prosthetic tooth set-up, reduces the number of patient visits as well as the time required.

Obtaining the radiographic scans (1330) of the patient's mouth may further include at least a radiographic scan obtained with an elastomeric dental material such as Coe-Soft (GC America) or any similar conformable materials that may be placed in the patient's mouth to facilitate accurate imaging of the gingival tissue surface. For example, capturing the radiographic image(s) of the patient's mouth, includes obtaining a plurality of radiographic scans (e.g., CT scan or equivalent), wherein at least one of the radiographic scans is obtained using a 3-in-1 radiopaque imaging guide to indicate the desired position of a plurality of teeth in relation to the patient's mouth, and to approximate the location on a fixed-bridge dental prosthesis. In a practical application of the disclosed CT scanning process, it is contemplated that a dental professional may obtain the required scans, and the images (image data) may then be transmitted using a network (e.g., Internet) to a dental laboratory for processing (1340). In summary, there are up to three scans or images that are obtained: i) bone with gingival tissue (using co-soft material to assure accurate imaging of gingival surface; (ii) position of implants and prosthetic shoes; and (iii) with the 3-in-1 temp guide.

Figure 13:
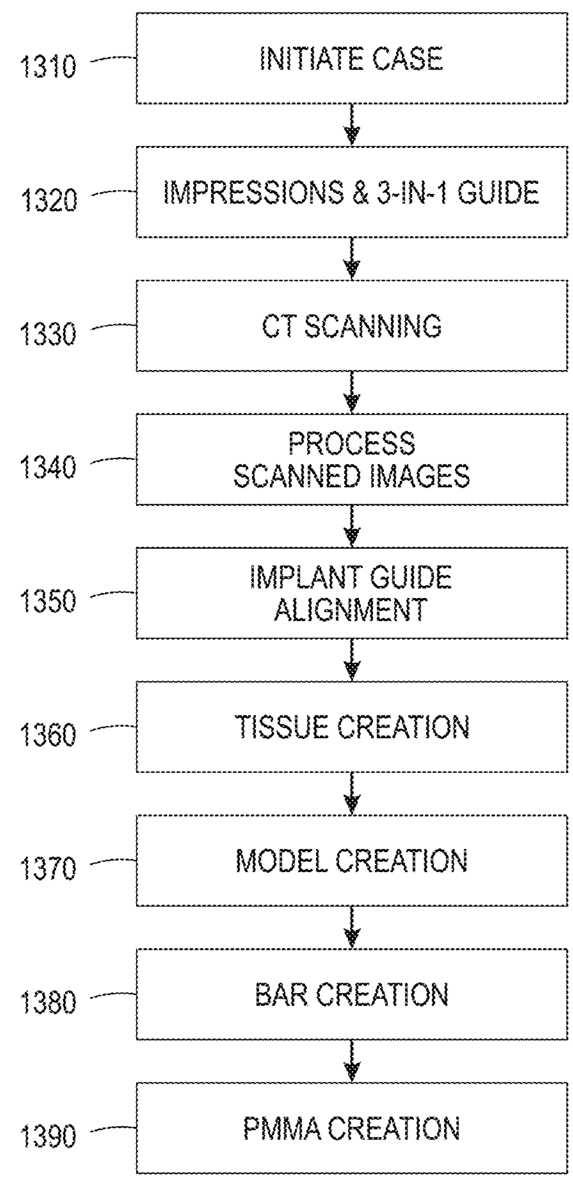
FIG. 13 is an illustrative process flowchart depicting design operations associated with the creation of digital models for a digital full arch in accordance with an aspect of the disclosed embodiments.
Figure 14A:
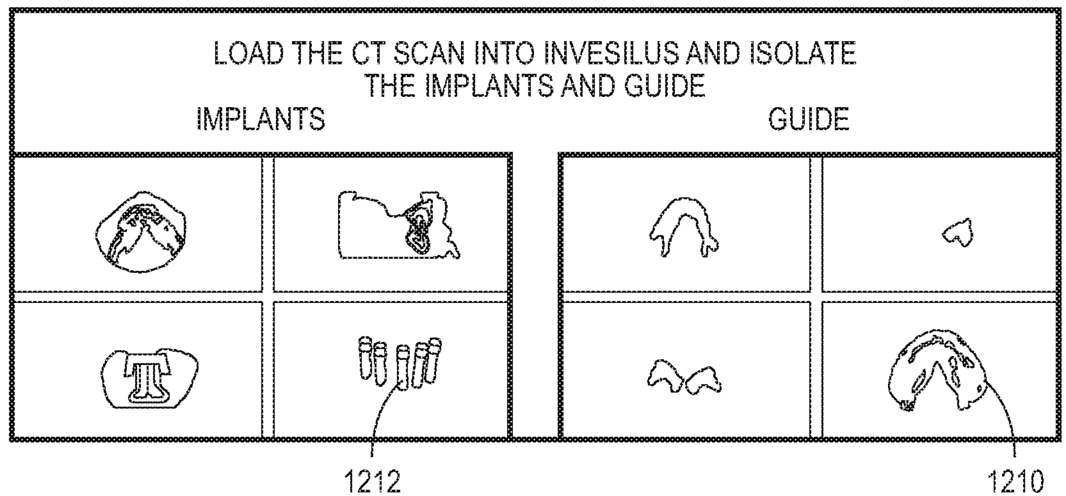
FIGS. 14A-14O and 15 are illustrative examples of the steps employed in processing CT radiographic image data so as to design a model of the fixed bridge prosthetic for rendering.
Figure 14B:
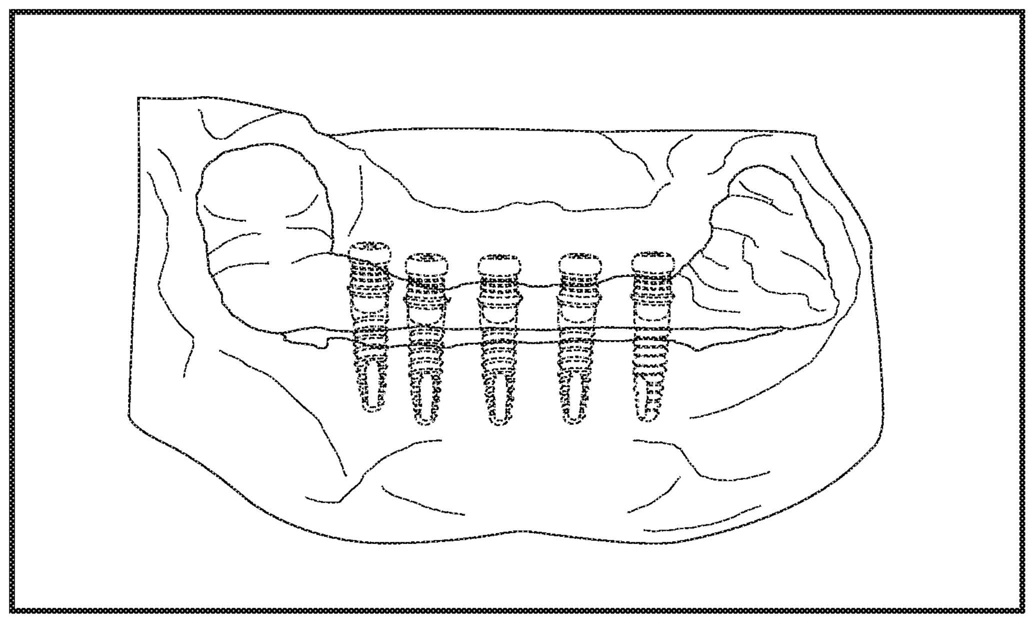

Once the scans are completed, data from the plurality of radiographic scans, are processed (1340) to create a digital model of the gingival tissue surface, as well as other features such as the position of the implants 114, prosthetic tooth set-up and associated prosthetic shoes. For example, the CT scanning operation is represented by 1330 in FIG. 13, and FIGS. 14A-14B show that at least one of the radiographic scans captures the positions of the prosthetic shoes and the orientation of the underlying implants. Data derived or manually determined from the plurality of radiographic scans of the patient's mouth, are further processed to update the digital model of the gingival surface with at least a portion of the prosthetic shoes represented thereon. FIG. 14A is intended to represent the outcomes of a secondary process carried out in addition to the primary creation of models in the Zirkonzahn dental CAD/CAM system. In particular, in the secondary process a software system is used to process the CT scan data and isolate at least one of the following: implants, prosthetic shoes, and the 3-in-1 guide, from the balance of the scan image/data. The software generates virtual three-dimensional models corresponding to parts of the human body (e.g., tissue surfaces) as well as the dental components. After constructing three-dimensional images, the software enables generation of stereolithography (STL) files, which can in turn be employed within the dental CAD/CAM software for the design and fabrication of the dental prosthesis and its components. Such software converts DICOM (Digital Imaging and Communications in Medicine; a standard for storing and transmitting medical images) data to three-dimensional (3D) images as STL files for manufacturing physical objects.

Examples of software believed to be capable of performing the secondary process noted above and isolating the 3D surfaces includes:

InVesalius, which generates virtual three-dimensional models corresponding to parts of the human body such as tissue surfaces;

Materialise Mimics, an advanced segmentation toolbox for patient specific-device design;

3D Slicer, a flexible, modular platform for image analysis and visualization

Mango, tools for creating and editing regions of interest within images, surface rendering, image stacking, and filtering in space domain;

Osirix, an image processing application dedicated to DICOM images; and

GIMIAS, a workflow-oriented environment focused on biomedical image computing and simulation.

In one embodiment, for processing of images in operation 1340, the CT scans are imported into InVesalius (InVesalius 3.0) which is used to isolate elements in the scan data and create surfaces based upon a selection and the processing of the scan data. For example, a region(s) of interest (e.g., implants or 3-in-1 guide as in FIG. 14A) is selected using a sagittal view window to isolate a sagittal slice of the 3-in-1 guide. Once an adequate portion of the 3-in-1 guide has been isolated, the "Create Surface" operation can be used to produce the model (see e.g., 1210), which is a digital 3D surface. Similarly, the implants are isolated using an axial image slice. Once isolated the Create Surface operation is similarly used to create the representation (1212), to produce a digital 3D representation of the implant surfaces that may be saved for export from InVesalius. Furthermore, the export from InVesalius may then be re-imported into the Zirkonzahn system. As will be appreciated, other data points may be captured from the CT scan information, including CT markers that may be employed to assure alignment of elements during the digital design process.

It should be noted that the function or operation of the software employed to isolate the 3D surface data from the images may be, to an extent, reliant upon a library of data that characterizes the known components (e.g., implants, prosthetic shoes, CT markers, etc.) that are recognized and isolated by the software. It is also the case that the more information that can be supplied to the software to indicate what is to be isolated, the more accurate the isolation. Accordingly, rather than simply seeking to isolate the prosthetic shoes, as that is what the dental prosthetic will ultimately be attached to, improved results may be obtained when an entire assembly including a prosthetic shoe and an implant, or a shoe, collar and implant, are matched. Not only is the match improved, but the system is better able to identify axial and angular orientations for such assemblies, thereby improving the accuracy of the 3D models generated—and employed for the balance of the process as described below.

Figure 14C:
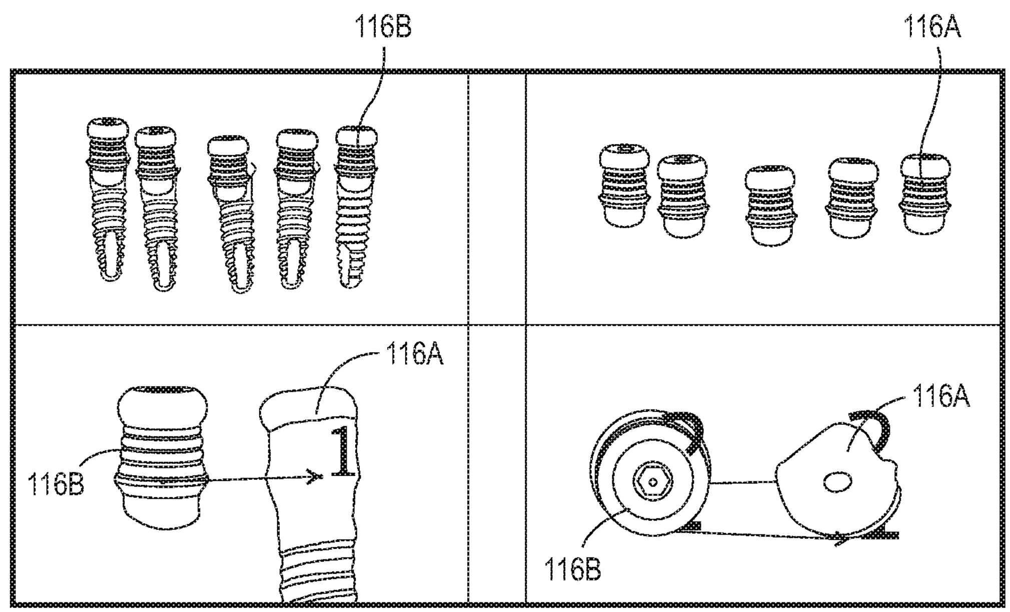

In operation 1350 of FIG. 13, the implant and guide alignment is accomplished. Here, having saved the isolated shoes and/or implants, the dental CAD/CAM system is employed to first import the data representing both the 3-in-1 guide and the shoes/implants. Once imported, an operator aligns the prosthetic shoe model (from a stored library) to the implants, such as depicted in the image sets of FIG. 14C. More specifically, the isolated shoes in the right-most side (116A) are replaced with a corresponding library image for the shoes (116B), and are placed in the same position and orientation as the isolated shoes. The image is matched to the scanned image as closely as possible in order to accurately characterize the orientation and position of the shoes and implants. Notably, the CT markers that are isolated may be used to align the scanned 3-in-1 guide to the implants, and best fit matching may be employed in the CAD/CAM system to register the markers within the image data.

Figure 14D:
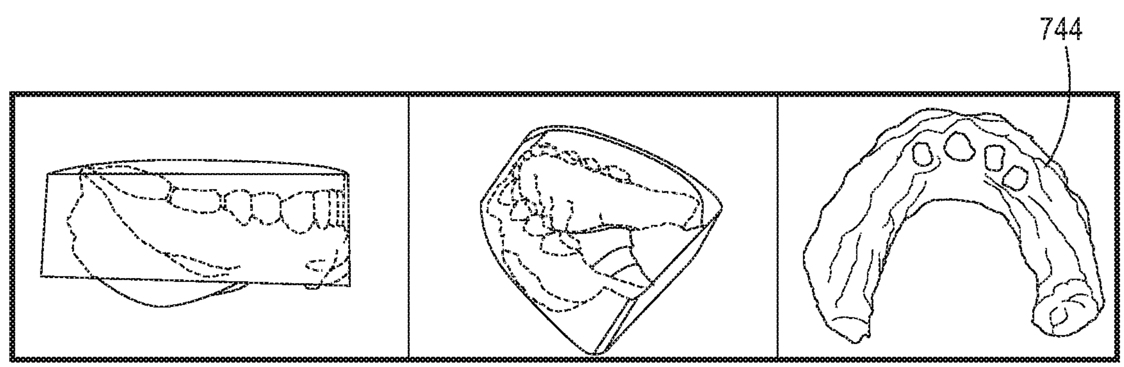
Figure 14E:
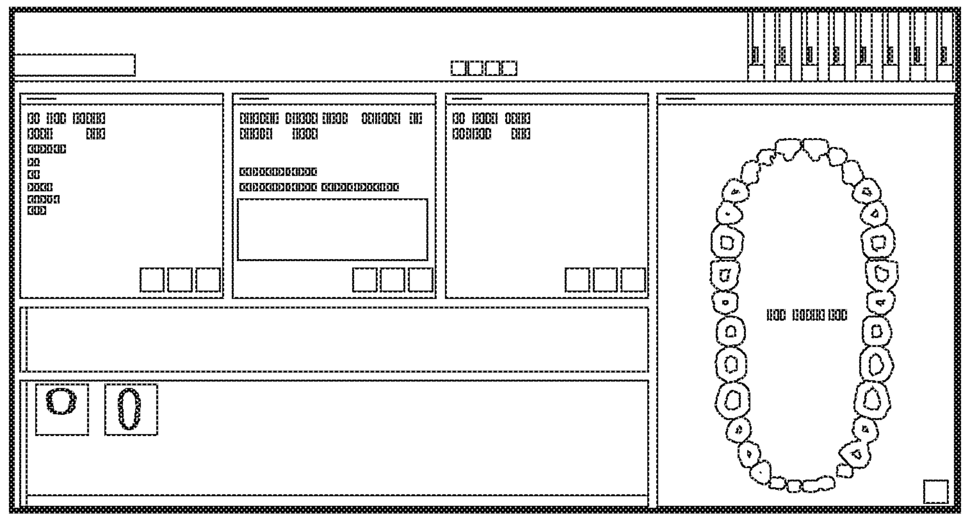

As represented by operation 1360, and FIGS. 14D-14E, the tissue creation operation is used to isolate and include the patient's tissue surface (e.g., gingival surface 744) for use in creation of a model. The tissue creation operation is also conducted using dental CAD/CAM software, and employs the isolated guide and tissue surfaces that were previously described as being generated (isolated) by the InVesalius software. As depicted in FIG. 14A (rightmost) the isolated guide is again imported. For example, the 3-in-1 alignment guide data is opened as a STL file and, as represented in part by the illustrations of FIG. 14D-14E, the gingiva surface (744) is created from the CT scan data and represented. In general, the tissue creation employs the Zirkonzahn Modellier to first prepare a base plate, align the gingiva scan (isolated surface), and thereby create the "scene" as the patient's gingiva. The base plate can further be saved as a waxup as represented in the CAD illustrations of FIG. 14D. Furthermore, the gingiva model data (STL file) and the implant data can be saved together as the beginning of a model creation file, and for purposes of the dental prosthetic design, it may also be possible to trim or cut-off the bottoms of the implants with the model data in order to allow for the creation of an associated stereolithography file.

Figure 14F:
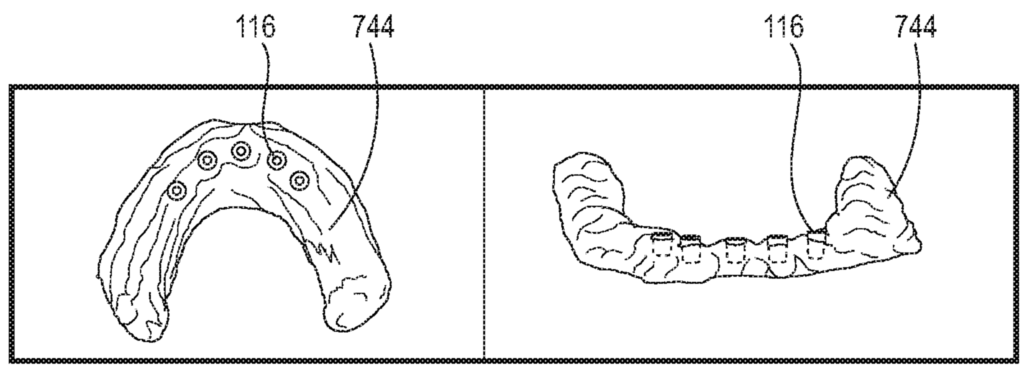
Figure 14G:
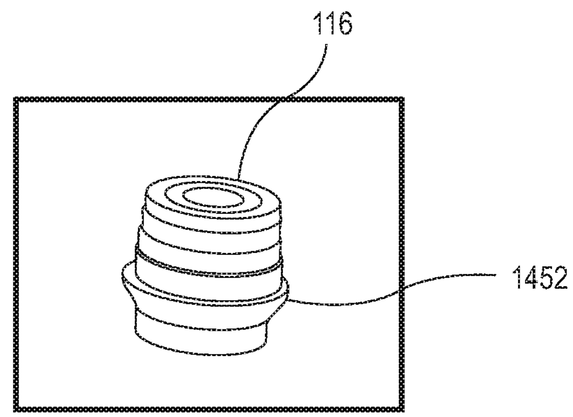
Figure 14H:
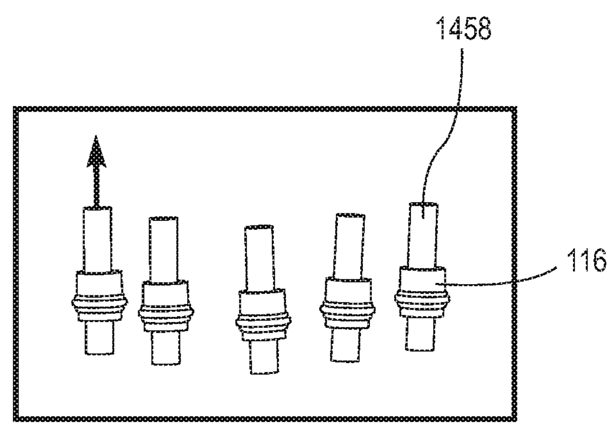
Figure 14I:
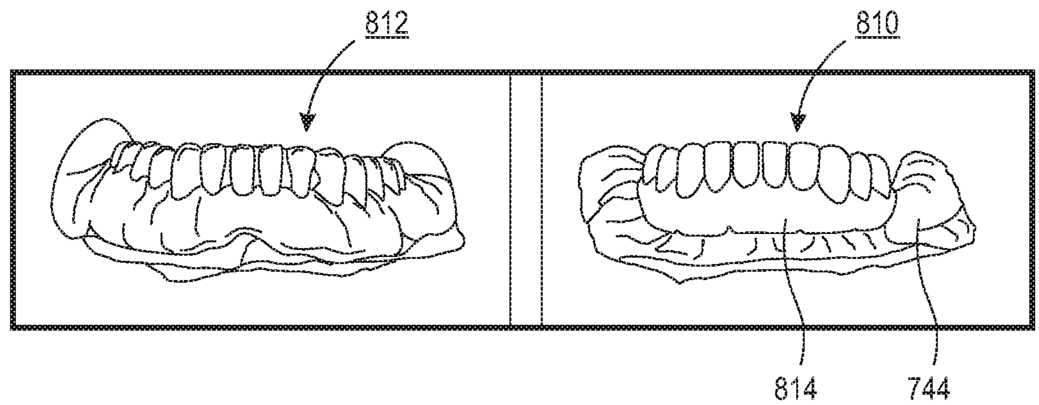

Next, as represented by 1370, the digital model of the gingival surface is modified to include at least a portion of the prosthetic shoes represented therein, as depicted in the CAD images of FIG. 14F. The model is then further refined by combining positions of the prosthetic shoes relative to the model of the gingival surface, the implants and a "waxup" of the dental prosthesis. As represented in the image of FIG. 14G, for example, the margins 1452 may be marked about the perimeter of the lower edge of the shoes 116. And, as represented in image 14H, the position and orientation of the shoe 116 may be further employed to position and place a screw channel 1458 in the model, to assure clearance for the mounting screw within and through the finished digital full arch prosthetic.

Using the digital model of the patient's mouth, and in particular a model of the fixed bridge-type dental prosthesis and associated prosthetic shoes, the prosthesis model may then be rendered. Although it is possible to render the prosthesis in a fully PMMA (monolithic) manner, also contemplated is multi-part prosthesis including creation of a bar or substructure that spans the prosthetic shoe positions and provides support for a PMMA material representing the "teeth" thereon. One or more aspects of the prosthesis may be directly or indirectly rendered through the use of a 3D printing system (e.g., as a physical model for investment casting).

Figure 14J:
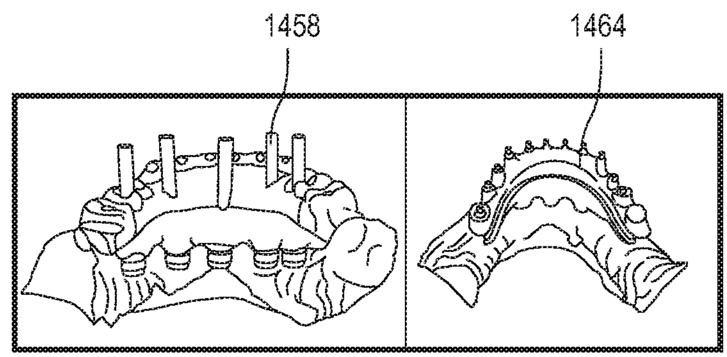

Referring also to FIGS. 141 and 14J, as with conventional polymer (e.g., poly methyl methacrylate (PMMA)) device design the dental CAD/CAM system is employed to merge and process the gingiva, shoes and 3-in-1 guide data to create a model 812 in the form of the waxup. The operator may then "carve" or sculpt the model to create a waxup model 810 to, among other modifications, emphasize or adjust the embrasures of the teeth, the tooth shapes for the posterior teeth, as well as to smooth out the flange 814 on the bottom of the waxup, and provide gradual transitions along the bottom to points around locations where the shoes are to be placed. The operator may also adjust any interferences identified from opposing arch data (surfaces) that may be imported. The final model is then saved to complete the digital model creation operation.

Next, bar creation operation 1380 may also be performed using the dental CAD/CAM system. In this operation the model created above as a waxup is employed and reduced to create a substructure. Using imported data for gingiva, shoe placement, screw channels, digital full arch design, etc., as shown on the left side of FIG. 14J, a substructure 1464 may be created. In one embodiment the surface of the substructure may be smoothed out along the top (upper surface of substructure 1464 in FIG. 14J), and indeed a raised or contoured surface of 1-2 mm tall between ledges may be provided in a generally continuous manner along the top surface of the substructure to assure retention of the PMMA thereon. For example, using the CAD/CAM system, after smoothing out the top surface an operator might create a raised surface on the top of the framework and create a ledge on the buccal of the framework. Furthermore, when designing the bar it is important that the finish line is clean and even cut, and the operator must assure the emergence of the bar is smooth and there is adequate space between the bar and gingiva. Indeed, the bar is a hygienic design that only needs cleaned annually, and the underside of the bar should be carved out so that cleaning is possible, and to make sure the bar is not too thick.

In one embodiment, the substructure model 1464 may be physically created or rendered in one of several methods. One method is, using the model of the bar, subsequently printing the model using a 3D printer (e.g., Cambridge). The 3D printed substructure may then be used to prepare a metal substructure, using an investment casting process, whereby the substructure or "bar" is cast and then divested, blast or peened to provide a roughened surface for adhesion (see e.g., FIG. 14O; bar 1466), to which a near net shape PMMA structure may be adhered.

Another method to create or render the bar or substructure may be to machine the substructure from a solid piece of material (metal) based upon the digital model, where the machined piece is the finished substructure. While simple in its manufacture, it will be appreciated that such a process is likely to be highly wasteful in the preparation of the bar, where the majority of a beginning piece of metal stock will be cut away.

Figure 14K:
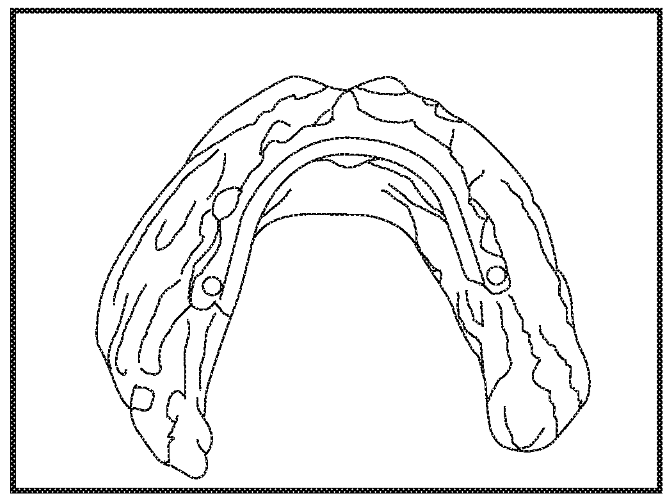
Figure 14L:
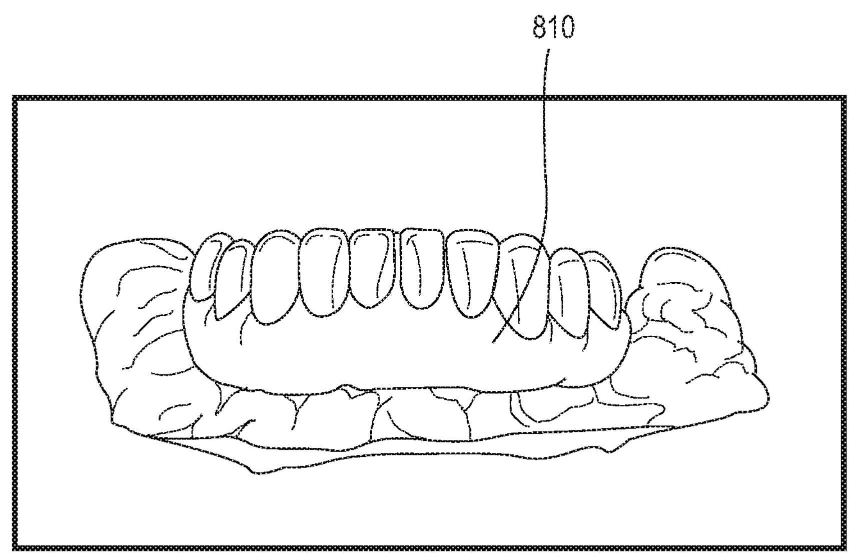
Figure 14M:
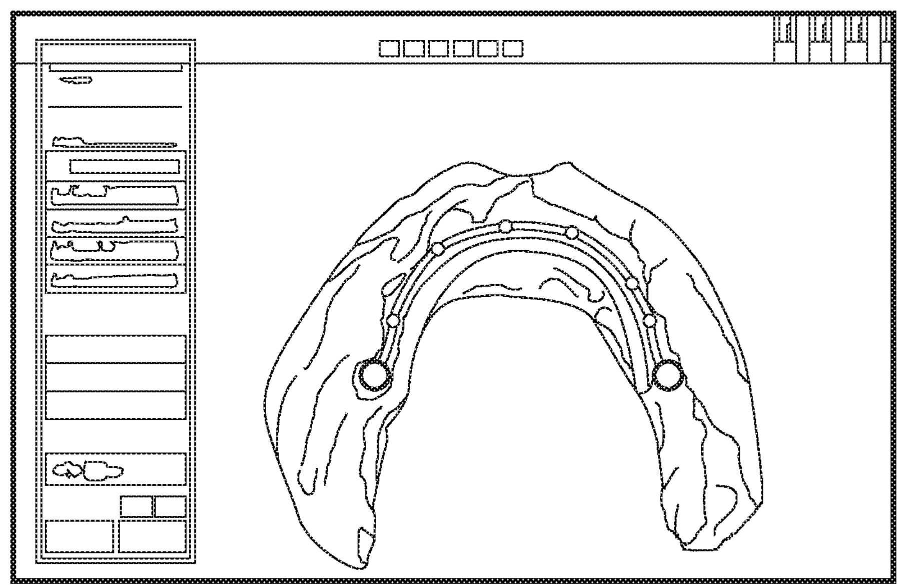
Figure 14N:
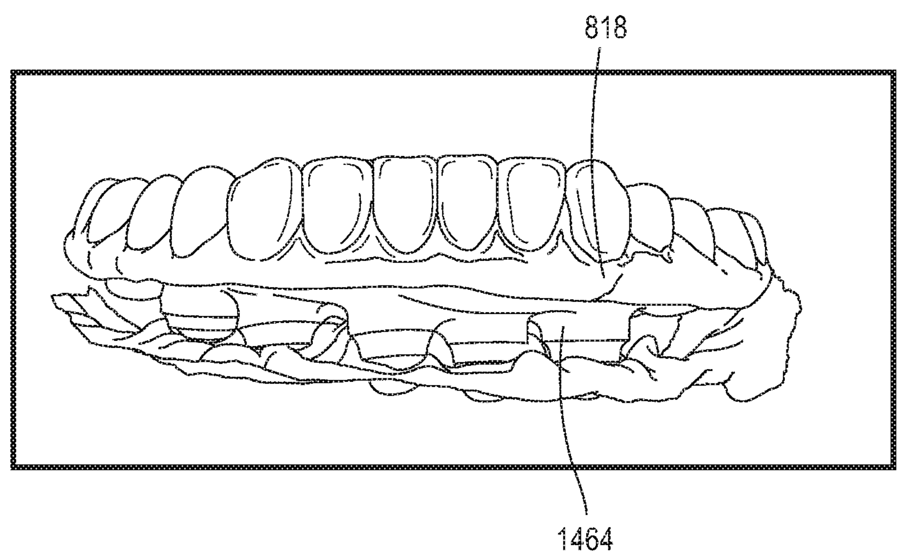
Figure 14O:
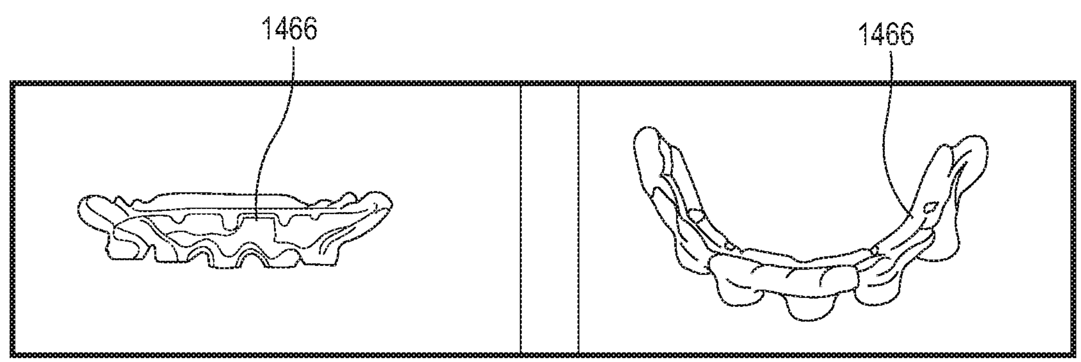

Returning to the design methodology of FIG. 13, a model of the substructure or bar is then employed for design of the final dental prosthesis in the operation indicated as PMMA creation (1390). As illustrated in FIG. 14K, for example, the gingiva surface and substructure data is imported and merged in the CAD system, and the result is a model on which the PMMA portion of the digital full arch is designed. Next, the cleaned-up waxup model discussed above is added to the data as illustrated, for example, in FIG. 14L. The margin around the middle of the buccal ledge and the top of the lingual high gloss area is drawn (e.g., FIG. 14M), and the operator may resolve any obscure points, once connected. And, the margin may be adjusted to the proper orientation. As represented by the model in FIG. 14N, any jagged or rough edges are then smoothed out and the PMMA portion 818 of the digital model may be saved, also as an STL file for milling or similar fabrication techniques.

Figure 15:
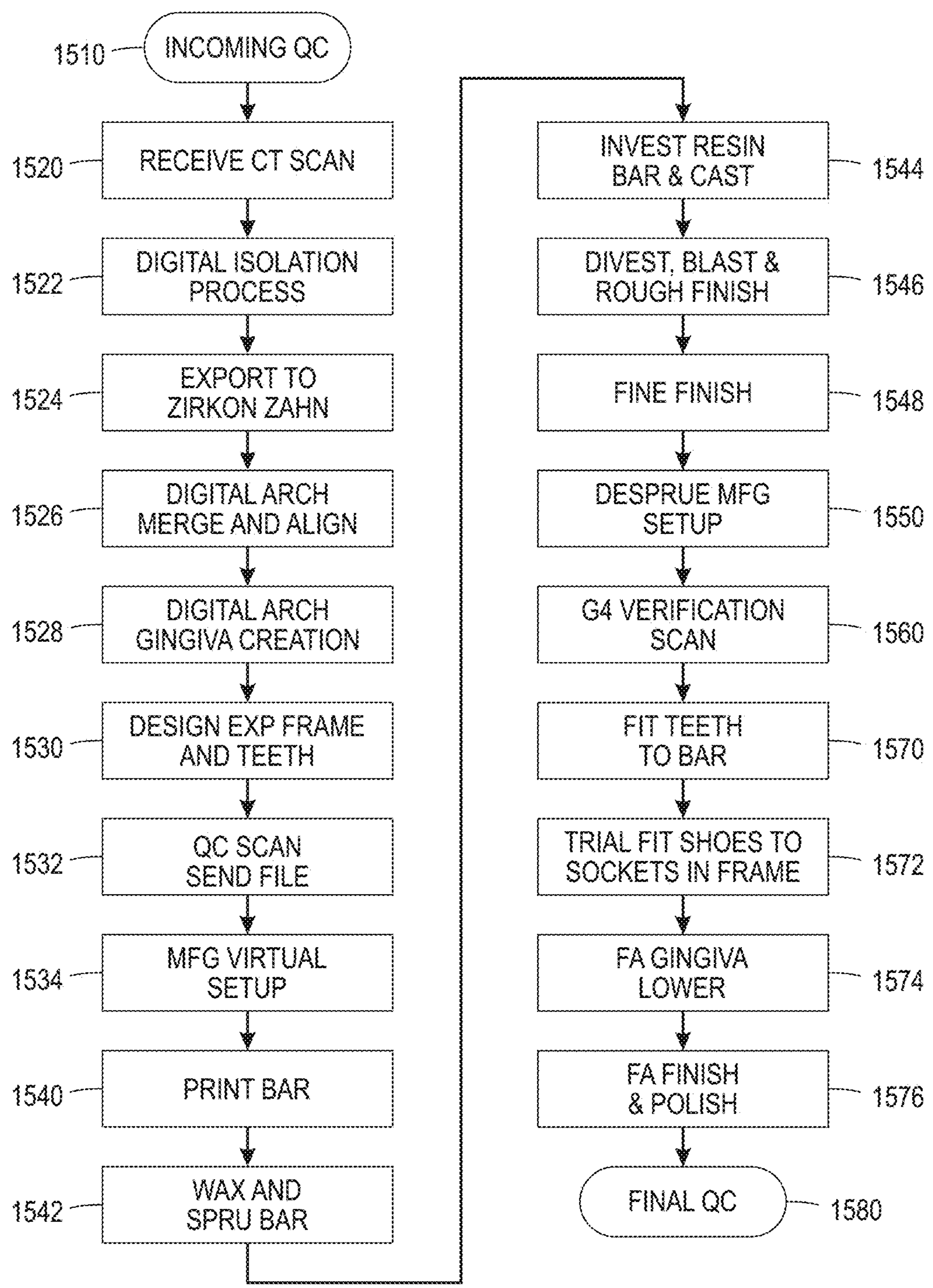

An exemplary process for creation of the fixed bridge-type dental prosthesis by a dental laboratory, incorporating the design operations for the digital full arch noted above, is illustrated in FIG. 15. Starting with an incoming quality control check 1510, the CT scan data (images) are received as reflected in step 1520. The scan data is processed, for example as noted above relative to the discussion of FIGS. 14A-14B, wherein surfaces such as the gingiva, implants, shoes and the like are isolated. The isolated surface information is saved and then exported for use in a dental CAD/CAM (e.g., ZirkonZahn) system as represented by 1524. Next, the CAD system is employed to merge and align the digital full arch (prosthesis) design based upon a 3-in-1 guide scan (1528), and the design is saved or exported for both the substrate or frame and the PMMA or teeth at step 1530. The information may be checked at a QC step 1532 before being passed for manufacturing at 1534. In the manufacturing steps, the substrate or bar is 3D printed at step 1540 and is then prepared as a wax model with a sprue at 1542 for investment casting at step 1544. Once cast, the bar is then divested and shot blasted to a rough finish at 1546 before it is fine finished (1548) and then desprued at 1550. The sprue is retained during finishing so that the entire surface is exposed for the rough finishing. At 1560 an optional verification scan may be used to assure all components are as intended. At 1570 the teeth or PMMA portion is fit to the substrate or bar to create the full arch, and at 1572 one or more shoes may be trial fit to the prosthesis in the receptacle designed in the framework. At 1574 the full arch clearance is checked before the full arch is finished and polished.

Figure 16A:
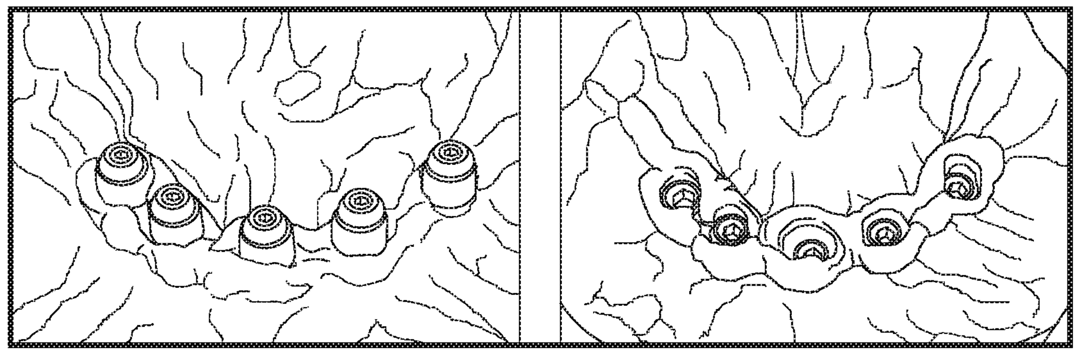
FIGS. 16A-16L are illustrative clinical photos of the preparation and cementation of the final prosthesis to completion.
Figure 16B:
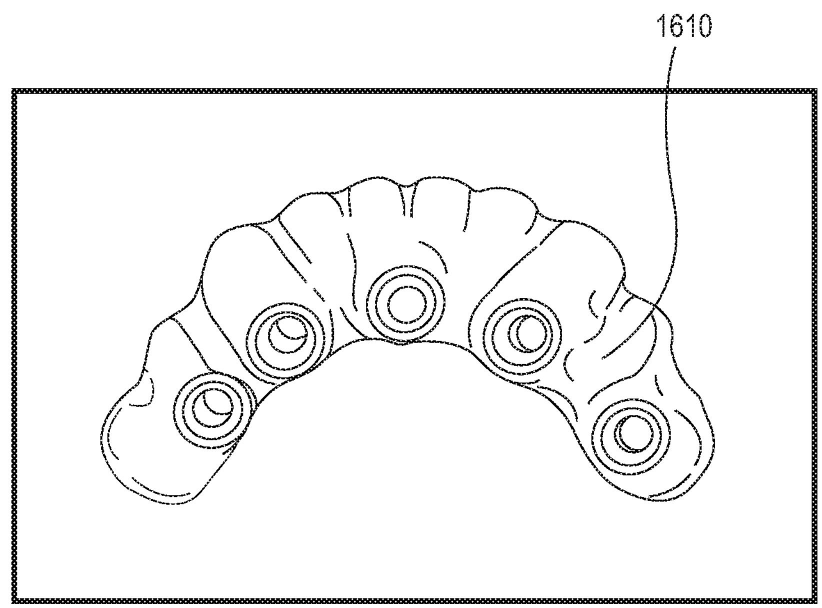
Figure 16C:
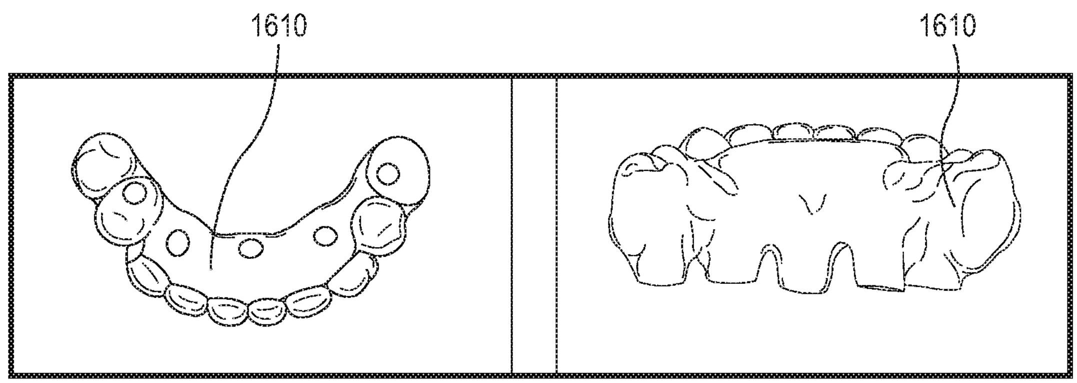
Figure 16D:
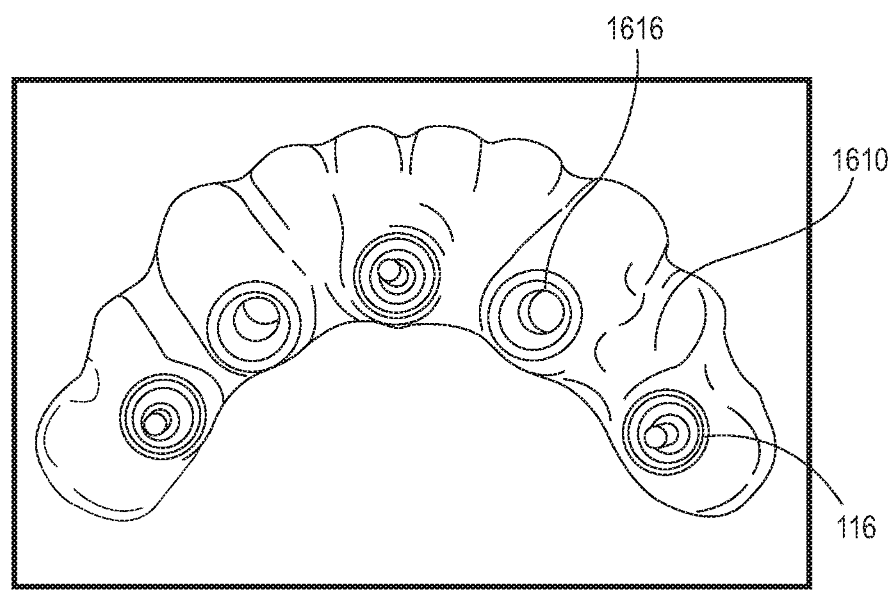
Figure 16E:
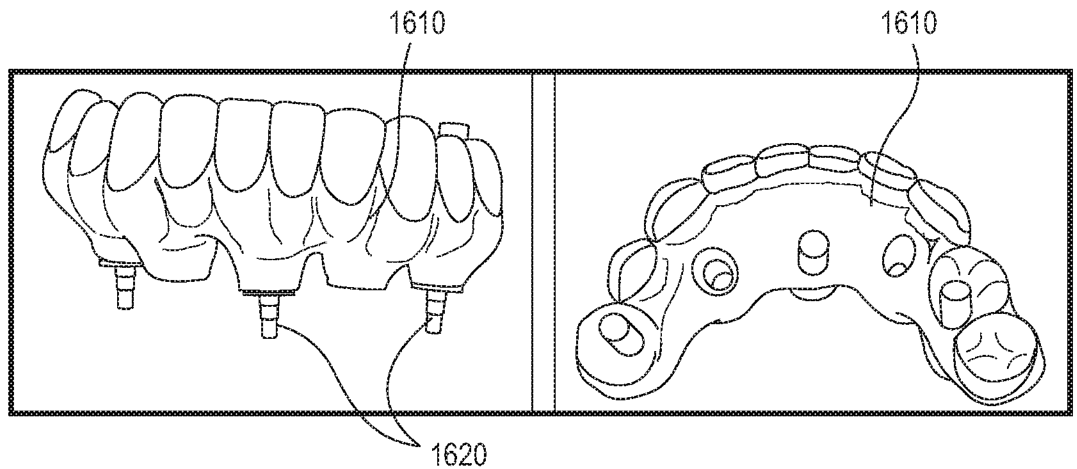

Having produced a full arch dental prosthesis, an exemplary process reflecting installation of the final prosthesis to completion is set forth in clinical photos 16A-16L. In FIG. 16A, the leftmost image illustrates five prosthetic shoes and healing sleeves in accordance with one of the embodiments depicted above (e.g., FIG. 1A). The rightmost image illustrates the patient's implants with the healing sleeves and prosthetic shoes removed. FIGS. 16B-16C are illustrations of a dental prosthesis 1610 produced in accordance with one of the methods disclosed herein. Next, FIGS. 16D-16E are illustrations of the prosthesis with three shoes (and attachment screws in FIG. 16E) temporarily fit into three positions in order to prepare for a verification fit (try-in) of the prosthesis.

Figure 16F:
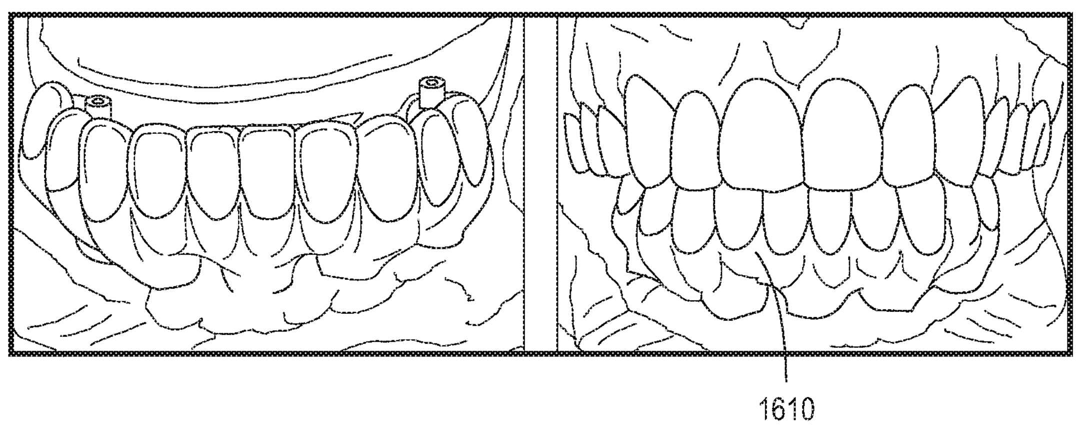
Figure 16G:
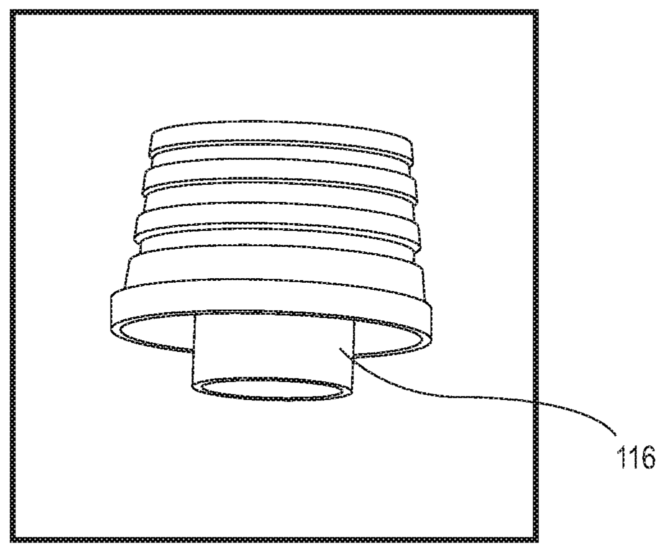
Figure 16H:
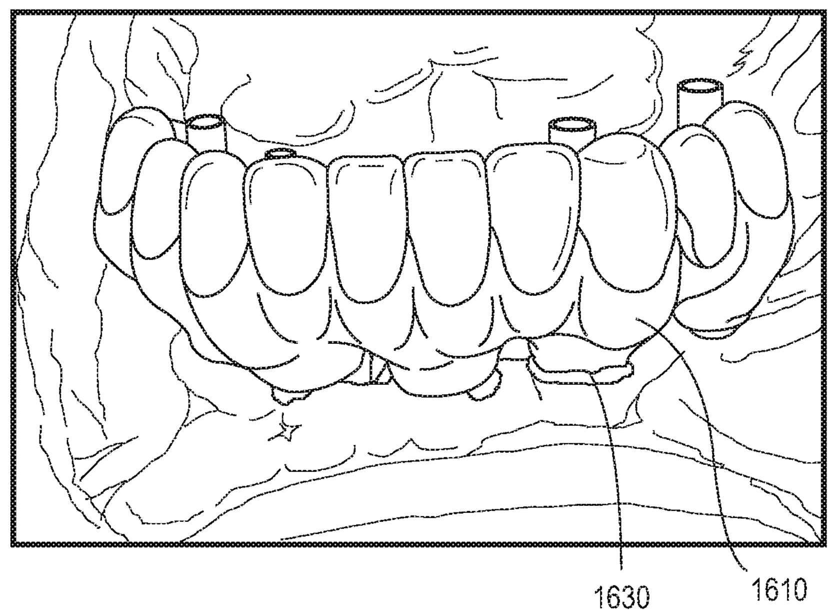
Figure 16I:
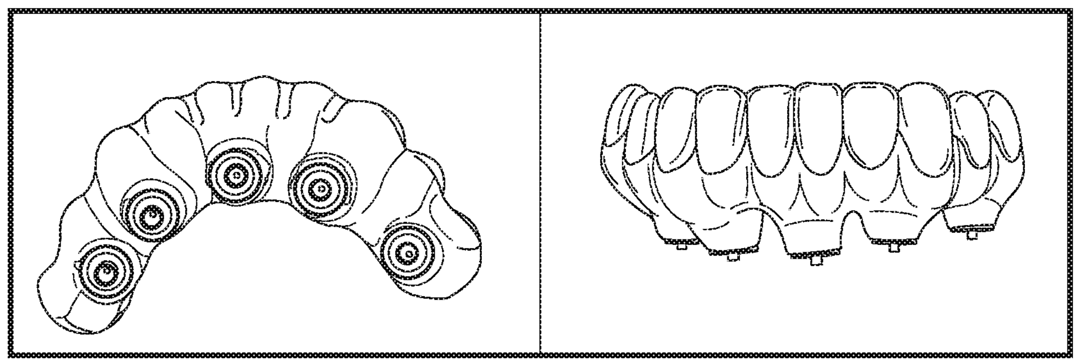
Figure 16J:
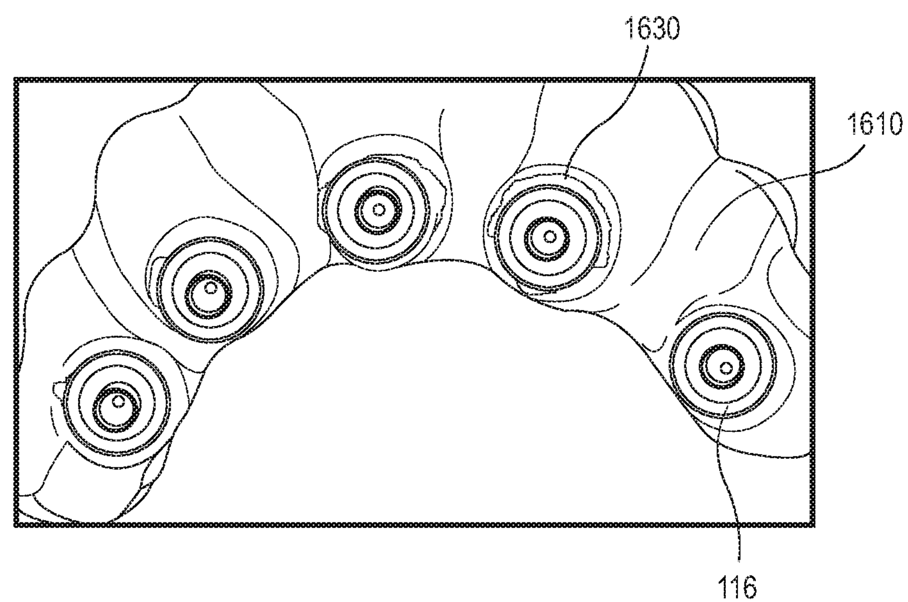
Figure 16K:
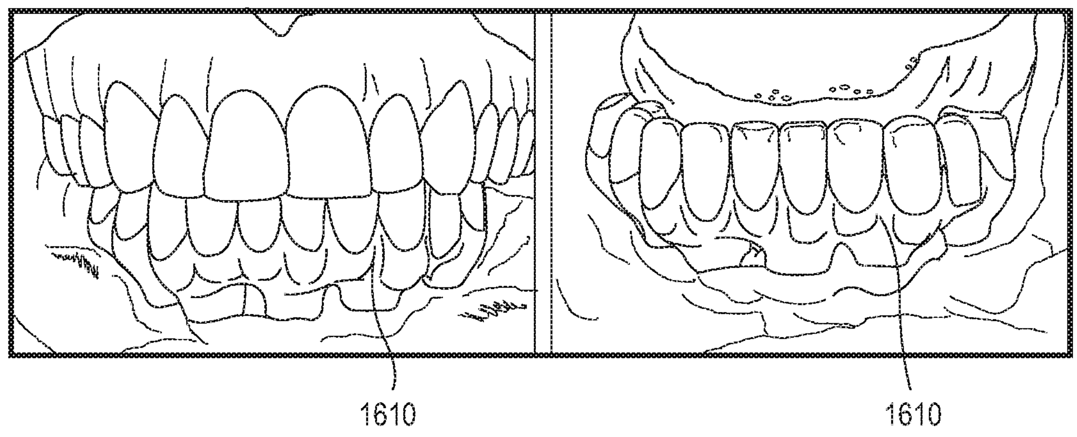
Figure 16L:
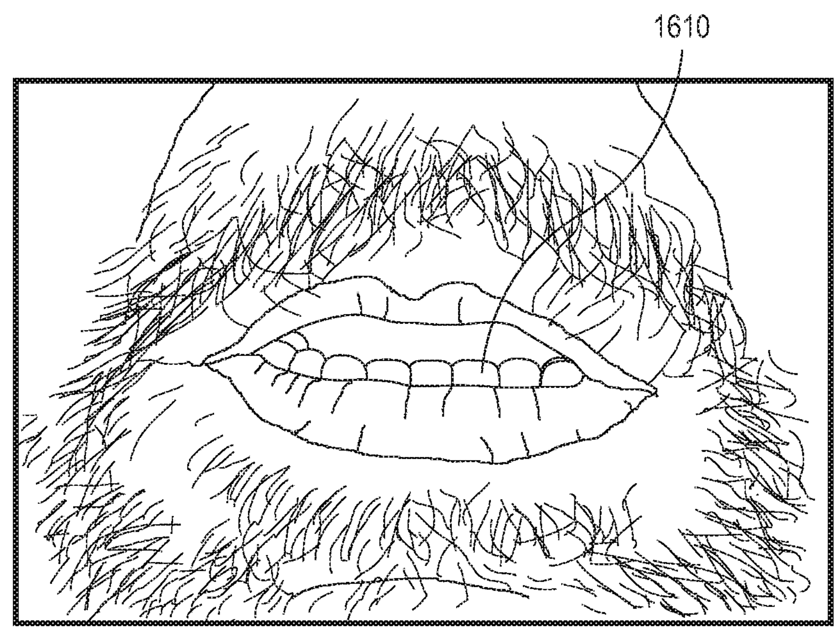

Also considering FIG. 16F, the prosthesis is depicted in the patient's mouth, placed in position and screwed to the three corresponding implants with screws 1620, for a try in, where not only the fit to the implants can be evaluated, but the relationship to the patient's other teeth as well, and where adjustments in the surfaces can be readily made. Once the desired fit is achieved, the full arch prosthesis 1610 is removed from the patient's mouth and the shoes 116 are prepared and cemented into the corresponding shaped receptacles 1616 in the prosthesis. In one embodiment, the shoes are cemented into the prostheses using cement or a suitable oral adhesive that allows the prosthesis to be tightened to the patient's corresponding implants before the cement or adhesive material solidifies, as depicted in FIG. 16H. Once the cement or adhesive is set, the prosthesis is removed, as shown in the images of FIG. 16I, and then any extraneous cement 1630 is removed from about the shoes 116, and the prosthesis can be finish polished and finally re-inserted into the patient's mouth as depicted in the images of FIGS. 16K-16L.

As noted above, the prosthetic shoes 116 are each made of metal and have an exterior surface with at least one annular groove thereabout; and said healing sleeves further include at least one feature (e.g., a bump(s) or annular ring extending inward from the interior surface), such that upon temporarily affixing the healing sleeves to the prosthetic shoes, the feature engages the annular groves of the prosthetic shoes to removably join the healing sleeves to the prosthetic shoes. Moreover, features such as the annular grooves are helpful to identify and locate the shoes relative to the implants, thereby improving the accuracy of the prosthetic that is designed. The annular grooves are also employed to assist with affixing the shoes 116 within the prosthesis 1620. And, in an alternative embodiment, the exterior surface of shoes 116 may be treated, for example, shot peened or sand blasted as represented in FIG. 16G, to alter the surface texture (roughen) to further improve adhesion between the shoe and the prosthesis.

As the healing sleeve may be removed, it is contemplated that when the fixed bridge-type dental prosthesis has been fabricated, the healing sleeves are removed and the prosthesis is permanently affixed to the prosthetic shoes, the same shoes or an identical set of shoes, to install or mount the prosthesis to the implants. Moreover, the installation may be completed intraorally so as to further reduce the time and steps required.

In summary, one method for installation of a fixed bridge-type dental prosthesis within a patient's mouth, includes inserting multiple dental implants 114 into the patient's alveolar tissue 140 (mandible or maxilla), and attaching a prosthetic shoe 116 to each of the dental implants using a center screw through the prosthetic shoes each having a tapered exterior surface with at least one annular groove. To each of the prosthetic shoes, a healing sleeve 118 is temporarily affixed. At one end the healing sleeve has a generally cylindrical outer surface and a tapered interior surface, where the taper matches that of the prosthetic shoes when said healing sleeves are affixed thereon. In addition to the several uses made of the prosthetic shoes and healing sleeves, the combination further prevents the post-insertion overgrowth of gingival tissue over the implants.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. A method of preparing a fixed bridge-type dental prosthesis for attachment to a plurality of dental implants within a patient's mouth, comprising:

immediately following dental implant surgery to place the plurality of dental implants within the patient's mouth, capturing at least one radiographic image of the patient's jaw and mouth, said captured image including representations of alveolar tissue, gingival tissue the plurality of dental implants, and a prosthetic shoe associated with each implant, wherein capturing at least one radiographic image includes obtaining a plurality of radiographic scans, wherein at least one of said radiographic scans captures the positions of the prosthetic shoes associated with each of the plurality of dental implants and the orientation of each associated implant and at least one of said radiographic scans captures the desired positions of a plurality of teeth in relation to the patient's mouth;

processing said radiographic scans to create a digital model of the gingival tissue surface;

deriving data from the plurality of radiographic scans to update the digital model of the gingival tissue surface to include at least a portion of the prosthetic shoes represented thereon; and further modifying the digital model of the gingival tissue surface to superimpose a model of at least a portion of the fixed bridge-type dental prosthesis, including positions as well as orientations of the prosthetic shoes associated with each of the plurality of dental implants relative to the fixed bridge-type dental prosthesis.

2. The method according to claim 1 further including temporarily affixing, to each of the prosthetic shoes, a healing sleeve having a generally cylindrical outer surface on a first end of the healing sleeve and a tapered interior surface on the first end, said tapered interior surface matching the taper of the prosthetic shoes when said healing sleeve is placed thereon, wherein said healing sleeve prevents the post-implant overgrowth of gingival tissue over the implants, wherein said healing sleeve comprises a radiolucent material.

3. The method according to claim 1, wherein capturing the radiographic image of the patient's mouth, includes obtaining a plurality of computerized tomography scans of at least the patient's mouth.

4. The method according to claim 1, wherein capturing the radiographic image of the patient's mouth, includes obtaining a plurality of radiographic scans of at least the patient's mouth, at least one of said radiographic scans obtained with a material placed in the patient's mouth to facilitate accurate imaging of the patient's gingival tissue surface.

5. The method according to claim 4, wherein at least one of said radiographic scans is obtained with a 3-in-1 imaging guide to indicate the position of a plurality of teeth on the fixed-bridge dental prosthesis.

6. The method according to claim 5, wherein data from the plurality of radiographic scans, are processed to create a digital gingival model of at least the gingival tissue surface.

7. The method according to claim 6, wherein data from the plurality of radiographic scans is further processed to create a digital model of the full arch, said digital model including receptacles for each of the prosthetic shoes based upon the portion of the prosthetic shoes represented in the radiographic scans.

8. The method according to claim 1, wherein said prosthetic shoes are each made of metal and have an exterior surface with at least one annular groove thereabout; and said healing sleeves further including at least one feature, such that upon temporarily affixing the healing sleeves to the prosthetic shoes, the feature engages the annular groves of the prosthetic shoes to removably join the healing sleeves to the prosthetic shoes.

9. The method according to claim 1, wherein said dental implants are inserted-into the patient's alveolar tissue and where said a prosthetic shoe associated with each implant is tapered on at least a portion of an outer surface thereof.

10. The method according to claim 1, wherein healing sleeves are temporarily affixed to each of the prosthetic shoes, said healing sleeves having a generally cylindrical outer surface on a first end thereof and a tapered interior surface on the first end, said tapered interior surface matching the taper of the prosthetic shoes when said healing sleeves are placed thereon, and where said healing sleeves prevent the post-implant overgrowth of gingival tissue over the implants.

11. The method according to claim 1, where capturing at least one radiographic image of the patient's jaw and mouth includes capturing images of:

i) bone with gingival tissue, using a co-soft material to assure accurate imaging of a gingival surface;

(ii) the position of the plurality of dental implants and associated prosthetic shoes; and (iii) a 3-in-1 radiopaque imaging guide indicating desired positions of a plurality of teeth in relation to the patient's mouth, and approximating the location on the fixed-bridge dental prosthesis.

12. The method according to claim 1, where at least one of the plurality of radiographic scans includes a 3-in-1 radiopaque imaging guide indicating desired position of a plurality of teeth in relation to the patient's mouth, and approximating the location on the fixed-bridge dental prosthesis, the method further comprising:

capturing the positions of the prosthetic shoes and the orientation of the underlying implants;

update the digital model of the gingival surface with at least a portion of the prosthetic shoes represented thereon;

isolating at least one of (i) dental implants, (ii) prosthetic shoes, or (iii) the 3-in-1 guide, from the data derived from the plurality of radiographic scans; and generating stereolithography files for use with dental CAD/CAM software to design and fabricate the fixed bridge-type dental prosthesis.

13. A method of preparing and installing a fixed bridge-type dental prosthesis within a patient's mouth, comprising:

inserting a plurality of dental implants into the patient's alveolar tissue;

attaching, to each of said dental implants, a tapered prosthetic shoe;

temporarily affixing, to each of the prosthetic shoes, a healing sleeve having a generally cylindrical outer surface on a first end of the healing sleeve and a tapered interior surface on a first end, said tapered interior surface matching the taper of the prosthetic shoes when said healing sleeves are placed thereon, wherein said healing sleeves prevent the post-implant overgrowth of gingival tissue over the implants; and immediately after implanting the plurality of dental implants, capturing a radiographic image of the patient's jaw and mouth, said captured image including representations of alveolar tissue and gingival tissue, each tissue level implant and at least a prosthetic shoe associated with each tissue level implant, and a 3-in-1 radiopaque imaging guide indicating desired positions of a plurality of teeth in relation to the patient's mouth, to approximate the location of the teeth on the fixed-bridge dental prosthesis.

14. The method according to claim 13, wherein said healing sleeve comprises a radiographically transparent material.

15. The method according to claim 13, wherein capturing the radiographic image of the patient's mouth, includes obtaining a plurality of radiographic scans of at least the patient's mouth.

16. The method according to claim 13, wherein capturing the radiographic image of the patient's mouth, includes obtaining a plurality of radiographic scans of at least the patient's mouth, at least one of said radiographic scans obtained with a material placed in the patient's mouth to facilitate accurate imaging of the gingival tissue surface.

17. The method according to claim 16, wherein capturing the radiographic image of the patient's mouth, includes obtaining a plurality of radiographic scans, wherein at least one of said radiographic scans is obtained with a 3-in-1 imaging guide to indicate the position of a plurality of teeth on the fixed-bridge dental prosthesis.

18. The method according to claim 17, wherein data from the plurality of radiographic scans, are processed to create a digital model of the gingival tissue surface.

19. The method according to claim 18, wherein capturing a radiographic image includes obtaining a plurality of radiographic scans, wherein at least one of said radiographic scans captures the positions of the prosthetic shoes and the orientation of the underlying implant.

20. The method according to claim 19, wherein data from the plurality of radiographic scans of the patient's mouth, are further processed to update the digital model of the gingiva surface with at least a portion of the prosthetic shoes represented thereon.

21. The method according to claim 20, wherein a digital model of the gingiva surface with at least a portion of the prosthetic shoes represented therein is further modified to further superimpose a model of at least a portion of the fixed bridge-type dental prosthesis, including the positions of at least a plurality of the prosthetic shoes relative to the model of the prosthesis.

22. The method according to claim 13, wherein said prosthetic shoes are each made of metal and have an exterior surface with at least one annular groove thereabout; and said healing sleeves further including at least one feature, such that upon temporarily affixing the healing sleeves to the prosthetic shoes, the feature engages the annular groves of the prosthetic shoes to removably join the healing sleeves to the prosthetic shoes.

* * * * *